(12) United States Patent
Okuyama et al.

(10) Patent No.: US 6,991,334 B2
(45) Date of Patent: Jan. 31, 2006

(54) POLARIZATION BEAM SPLITTING OPTICAL SYSTEM

(75) Inventors: Atsushi Okuyama, Saitama (JP); Masayuki Abe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 10/767,010

(22) Filed: Jan. 28, 2004

(65) Prior Publication Data

US 2004/0184006 A1 Sep. 23, 2004

(30) Foreign Application Priority Data

Jan. 31, 2003 (JP) ........................................ 2003-025322

(51) Int. Cl.
*G03B 21/14* (2006.01)

(52) U.S. Cl. ............................................ 353/20; 359/495
(58) Field of Classification Search ................... 353/20; 349/9; 359/487, 488, 495, 496, 497, 500
See application file for complete search history.

(56) References Cited

U.S. PATENT DOCUMENTS

| | | | | |
|---|---|---|---|---|
| 5,264,951 A | * | 11/1993 | Takanashi et al. .............. 349/25 |
| 5,327,270 A | * | 7/1994 | Miyatake ......................... 349/9 |
| 5,982,541 A | * | 11/1999 | Li et al. ......................... 359/497 |
| 6,290,358 B1 | * | 9/2001 | Sakai et al. ..................... 353/20 |
| 6,789,902 B2 | * | 9/2004 | Hayashi et al. ................. 353/20 |
| 6,829,090 B2 | * | 12/2004 | Katsumata et al. ............. 359/486 |
| 2003/0081317 A1 | * | 5/2003 | Katsumata et al. ............. 359/566 |

FOREIGN PATENT DOCUMENTS

JP          7-38050          4/1995

* cited by examiner

Primary Examiner—William C. Dowling
(74) Attorney, Agent, or Firm—Morgan & Finnegan, LLP

(57) ABSTRACT

A polarization beam splitting optical system is disclosed which reduces components of the P-polarization direction that are contained in polarized light that is analyzed upon being incident on a polarization splitting film in an inclined manner with respect to an optical axis of an optical system. This optical system includes a polarization splitting film, which guides polarized light from a first optical system to a reflection type image display element and then analyzes and guides polarized light from the image display element to a projection optical system. When δ is the phase difference of P-polarized light and S-polarized light at the polarization splitting film, the polarization splitting film satisfies the condition: $120° \leq |\delta| \leq 180°$.

16 Claims, 24 Drawing Sheets

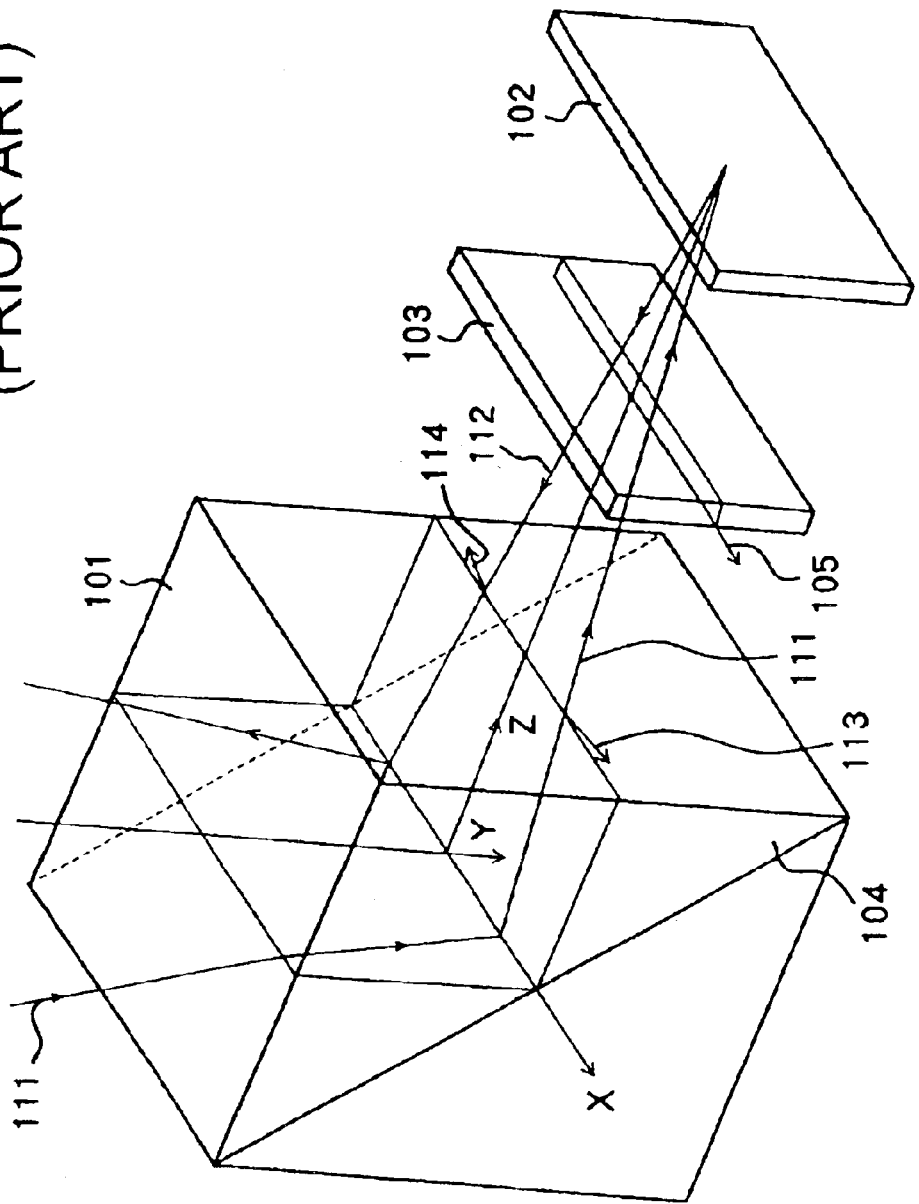

POLARIZATION BEAM SPLITTING OPTICAL SYSTEM

BACKGROUND OF THE INVENTION

1. Field of the Invention

This invention relates to a polarization beam splitting optical system and a projection type display optical system to be used in a projection type image display apparatus, which guides light using a polarization splitting film and projects the image of an original image formed on an image forming element.

2. Description of Related Art

As an example of a projection type image display apparatus, which projects and displays an image on a large screen, there is a display apparatus which makes use of a reflection type liquid crystal display element (reflection type image forming element). With this projection type image display apparatus, light (illumination light), which is made incident on a reflection type liquid crystal display element, is modulated in accordance with an original image displayed on the reflection type liquid crystal display element and is then reflected, and this modulated and reflected light (image light) is magnified and projected onto a screen by means of a projection optical system.

With such a projection type image display apparatus, there are cases where a polarization beam splitter is used to guide the illumination light to the reflection type liquid crystal display element and furthermore guide the image light, reflected by the reflection type liquid crystal display element, to the projection optical system.

Here, the polarization beam splitter provides both the action of a polarizer that prepares illumination light of a specific polarization component and the action of an analyzer that prepares image light of a specific polarization component.

As an example of an optical system of a projection type image display apparatus that uses a polarization beam splitter, there is that which is disclosed in Japanese Patent Publication No. H7(1995)-38050 (corresponding to U.S. Pat. No. 5,327,270). As shown in FIG. 31, with the optical system disclosed in this publication, a ¼-wave plate 103 is disposed between a polarization beam splitter 101 and a reflection type liquid crystal display element 102. And for a light ray 111, for which the polarization direction 113 after reflection by a polarization splitting film 104 of the polarization beam splitter 101 becomes inclined with respect to the X-axis direction in FIG. 31, the phase advance axis 105 of the ¼-wave plate 103 is set in the X-axis direction 105. The light ray 111 is thereby made to pass twice in a round-trip manner through the ¼-wave plate 103 before and after reflection by the reflection type liquid crystal display element 102 and the polarization direction 113 that is inclined with respect to the X-axis is thereby inverted with respect to the X-axis and made to coincide with the S-polarization direction 114 at the polarization splitting film 104 of the reflected light 112 reflected by the reflection type liquid crystal display element 102.

If the brightness of the projected image is to be made brighter, the F number of the illumination system must be made brighter and thus the angle of incidence of light onto the polarization beam splitter must be made greater. However, this may lower the analyzing performance of the polarization beam splitter.

Here, the F number (Fno) of the illumination system is related to the convergence angle $\psi$ of the illumination light flux that is converged onto an arbitrary point on the reflection type liquid crystal display element and is defined as:

$$Fno=1/(2 \tan \psi).$$

The problems that arise when the Fno of the illumination system is made brighter (less) shall now be described using FIG. 21.

With the prior-art optical system shown in FIG. 31, only the light rays that are parallel to the X-Y plane of the coordinate system, having the center of the polarization beam splitter 101 (polarization splitting film 104) as the origin, are taken into account as the light rays made incident on polarization beam splitter 101. However, with an actual illumination light flux, light rays are incident on the polarization beam splitter 101 from various directions centered about the Y-axis (optical axis) (at various angles with respect to the Y-axis) as shown in FIG. 21.

The inclinations of polarization directions in the light rays that are emerged from the polarization beam splitter 101 in this case can be expressed as shown in FIG. 22. y indicates the direction of a light ray that is incident on the incidence surface i (shown in FIG. 21) of the polarization beam splitter from the direction parallel to the Y-Z plane and x indicates the direction of a light ray that is incident on the incidence surface i from the direction parallel to the X-Y plane. Also, A indicates the direction of a light ray that is made incident from the direction parallel to a plane inclined by +45° with respect to the Y-Z plane and B indicates the direction of a light ray that is made incident from the direction parallel to a plane inclined by −45° with respect to the Y-Z plane. Hereinafter, the directions of A and B shall be referred to as "diagonal directions of the illumination light flux."

As shown in FIG. 22, the light rays besides those of the y direction are all in polarization states in which the polarization directions are inclined with respect to the x direction in accordance with the S-polarization directions of the respective light rays at the polarization splitting film 104. Also, even for the same A direction, light rays $a_1$ and $a_2$, which differ in the incidence angles onto the polarization splitting film, differ in the polarization inclination angles $\gamma a_1$ and $\gamma a_2$ as indicated by the following equations (the same holds for the polarization inclination angles $\gamma b_1$ and $\gamma b_2$ of the incident rays $b_1$ and $b_2$ from the B direction).

$$\gamma a_1 = -\gamma b_1 \neq \gamma a_2$$

$$\gamma a_2 = -\gamma b_2 \neq \gamma a_1$$

In FIG. 23, for the light ray $a_1$, the polarization state after emergence from the polarization beam splitter 101 is indicated as $P_1$ and the polarization state after round-trip passage through the ¼-wave plate 103, shown in FIG. 21, is indicated as $p_2$.

The polarization directions of the polarization states $p_1$ and $p_2$ are in an inverted relationship with respect to the x-axis due to the action of the ¼-wave plate 103. Here, since the light ray $a_1$ is reflected by the reflection type liquid crystal display element 102, when it is incident on the polarization beam splitter 101 again, it will be light that proceeds along the same optical path as but in reverse of the optical path of the light ray $a_2$ that is emerged from the polarization beam splitter 101.

The S-polarization direction at the polarization splitting film 104 at this point is the direction of polarization inclination of the light ray $a_2$ in FIG. 22, and this direction is indicated by a dotted line in FIG. 23.

As can be understood from FIG. 23, a deviation A arises between the polarization direction $p_2$, resulting from conversion by the ¼-wave plate 103, and the S-polarization direction at the polarization splitting film 104, and even if the polarization splitting performance of the polarization splitting film 104 is ideal, a light ray of a diagonal direction (the direction of A or B) of the illumination light flux will not be analyzed completely.

This deviation A becomes more significant the greater the angle ψ with respect to the Y-axis (optical axis of the illumination light flux) at the incidence surface i of the polarization beam splitter in FIG. 21, that is, the brighter the Fno of the illumination system. The amount of leakage light at the polarization beam splitter 101 is thus increased, and as the brightness of a projected image is made brighter, the contrast is lowered further.

Here, since the S-polarized components are removed by the polarization splitting film, the polarization direction of the leakage light is the direction of the P-polarization component $m_1$ at the polarization splitting film as shown in FIG. 24. In order to compensate for the characteristics of the polarization beam splitter, an analyzing element, such as a polarizing plate having a transmission axis in the direction of the Y-Z plane, may be added to the emergence side of the polarization beam splitter 101. However, since the oscillation direction of the leakage light (P-polarization component) $m_1$ is substantially the same as the direction (y direction) of the transmission axis of the polarizing plate 105, most of the leakage light $m_2$ will remain as shown in FIG. 25. Thus the leakage light described here will necessarily reach the screen if it is emerged from the polarization beam splitter.

SUMMARY OF THE INVENTION

An object of the invention is to provide a polarization beam splitting optical system, which reduces a P-polarization component contained in polarized light that has been analyzed upon being incident on a polarization splitting film in an inclined manner with respect to an optical axis of a first optical system (illumination optical system), and which, when used for image projection, enables improvement of the contrast of the projected image.

In order to achieve the above object, one aspect of the present invention relates to a polarization beam splitting optical system which comprises a polarization splitting film that guides polarized light from a first optical system to a reflection type image display element and then analyzes and guides polarized light from the image display element to a projection optical system. Here, when δ is the phase difference of the P-polarized light and the S-polarized light at the polarization splitting film, the polarization splitting film has a structure that satisfies the condition:

$$120° \leq |\delta| \leq 180°. \tag{1}$$

Another aspect of the present invention relates to a polarization beam splitting optical system which comprises a polarization splitting film that guides polarized light from a first optical system to a reflection type image forming element and then analyzes and guides polarized light from the image forming element to a second optical system wherein the polarization splitting film has a structure by which the polarization direction of polarized light that is incident on the polarization splitting film at an angle θ with respect to a normal to the polarization splitting film and at a first azimuth angle and that is reflected by the polarization splitting film, is between:

(i) the polarization direction of polarized light that is reflected at the polarization splitting film, which is determined based on the geometrical relationship of the polarization splitting film and the direction of incidence of polarized light on the polarization splitting film, and (ii) the polarization direction of polarized light, after the polarized light has been incident on the polarization splitting film at the angle θ with respect to the normal to polarization splitting film and at a second azimuth angle which is directly opposite to the first azimuth angle and has been reflected at the polarization splitting film and then has passed through a ½-wave plate.

The characteristics of the present invention shall be made clear by the following description of specific embodiments with reference to the drawings.

BRIEF DESCRIPTION OF THE DRAWINGS

FIG. 31 is a diagram showing a prior-art polarization beam splitter.

DETAILED DESCRIPTION OF THE PREFERRED EMBODIMENTS

Embodiments of the present invention shall now be described with reference to the drawings.

Embodiment 1

Figure 1:
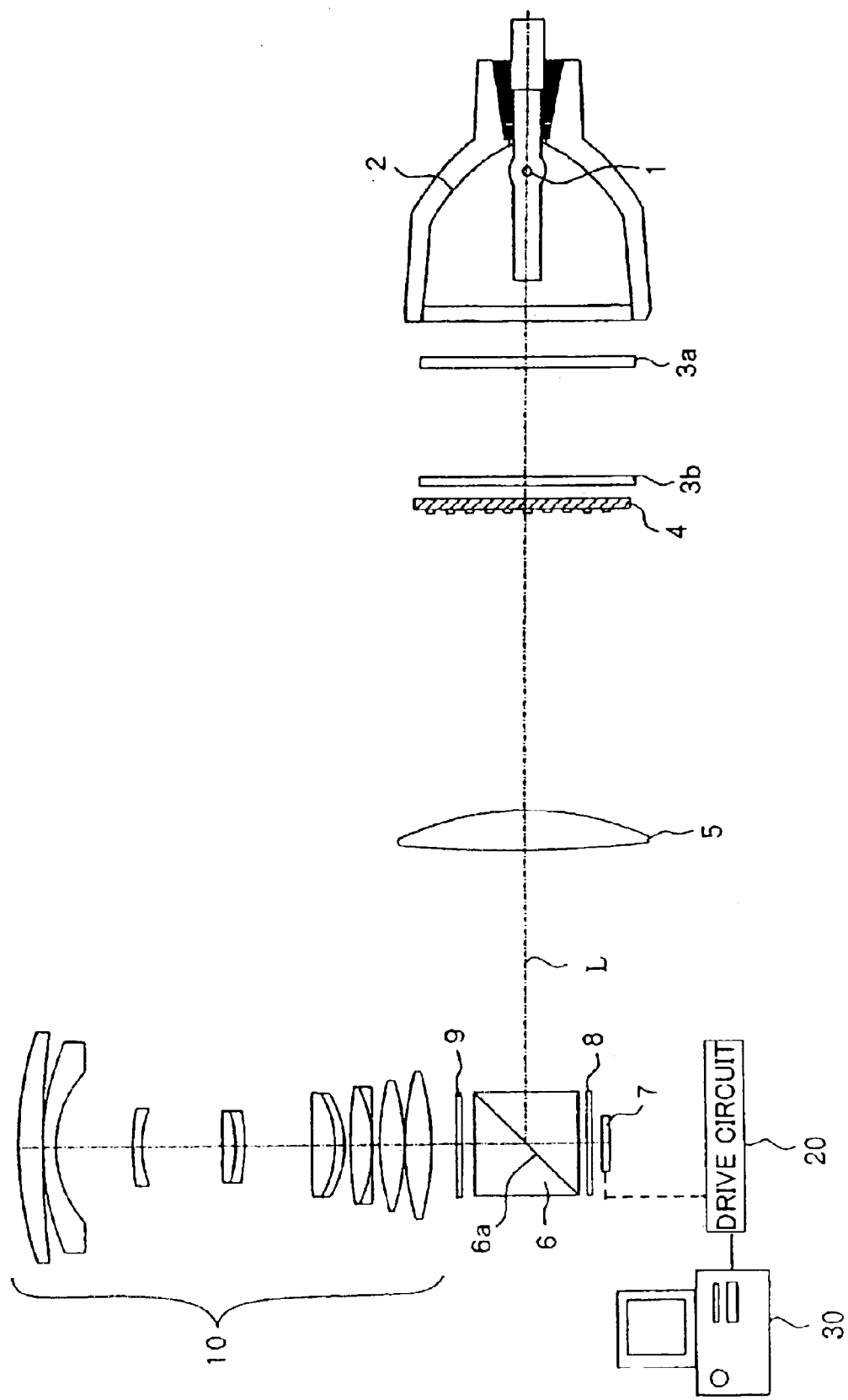
FIG. 1 is a diagram, showing the arrangement of a projection type display optical system (projection type image display apparatus), which is Embodiment 1 of the present invention.

FIG. 1 shows the arrangement of a projection type display optical system in a projection type image display apparatus, which is Embodiment 1 of the present invention.

In FIG. 1, Reference numeral 1 denotes a light source which emits white light of a continuous spectrum, and an extra-high pressure mercury lamp, etc., is used as this light source. Reference numeral 2 denotes a reflector, which converges the light from the light source 1 in a predetermined direction and makes the light a substantially parallel light and has a reflecting surface of a paraboloid shape (may also be an ellipsoidal shape).

Reference numeral 3a denotes a first fly-eye lens array, having rectangular lenses positioned in matrix form, and Reference numeral 3b denotes a second fly-eye lens array, having an array of lenses corresponding to the individual lenses of the first fly-eye lens array 3a.

Reference numeral 4 denotes a polarization conversion element, which converts non-polarized light from the light source 1 into light of a specific polarization direction (S-polarized light in the present embodiment). Reference numeral 5 denotes a condenser lens, which converges the light from the polarization conversion element 4.

Reference numeral 6 denotes a polarization beam splitter, having a polarization splitting film 6a that transmits P-polarized light and reflects S-polarized light.

Reference numeral 7 denotes a reflection type liquid crystal display element (reflection type image forming element), which displays an original image, reflects incident light (illumination light), and modulates the illumination light in accordance with the original image.

Here, a drive circuit 20 is connected to the liquid crystal display element 7 and image information from an image information supplying apparatus 30, which may be a personal computer, video deck, television, DVD player, etc., is supplied to the drive circuit 20. The drive circuit 20 outputs signals for making the liquid crystal display element 7 display the original image based on the supplied image information.

Reference numeral 8 denotes a ¼-wave plate. The ¼-wave plate 8 is disposed between the polarization beam splitter 6 and the liquid crystal display element 7.

Reference numeral 9 denotes a polarizing plate, which transmits light of a specific polarization state among the image light emerging from the polarization beam splitter 6. Reference numeral 10 denotes a projection lens (second optical system), which projects the image light that has been transmitted through the polarization plate 9 onto an unillustrated screen (projection surface).

The optical actions shall now be described. The light that is emerged from the light source 1 is converged in a predetermined direction by the reflector 2. Here, this reflector 2 has a paraboloid shape and onward from the focal point position of the paraboloid, the light becomes a light flux that is parallel to the symmetry axis of the paraboloid. However, since the light source 1 is not an ideal point light source but has a finite size, the converged light flux contains many light components that are not parallel.

This converged light flux enters on a first fly-eye lens array 3a. The first fly-eye lens array 3a is arranged by combining lenses, each having a rectangular external shape and a positive refractive power, in matrix form and the incident light flux is divided and converged into a plurality of light flux parts in accordance with the respective lenses, and via the second fly-eye lens array 3b, a plurality of light source images are formed in matrix form in the vicinity of the polarization conversion element 4.

Here, the fly-eye lens may be replaced with a lenticular lens array in which a plurality of lenticular lenses whose refractive powers in a predetermined direction are substantially the same to each other, are arrange in the predetermined direction. The predetermined direction is preferable to be a direction perpendicular to a color splitting plane and/or color combining plane. The color splitting plane is, in a case where one incident ray is divided into a plurality of emergent rays by using a dichroic mirror or polarization beam splitter, a plane formed by the incident ray and the plurality of emergent rays. The color combining plane is opposite of the color splitting plane.

The polarization conversion element 4 comprises a polarization splitting film and a ½-wave plate. The plurality of the light flux parts that are converged in matrix form are made incident on the polarization splitting film in correspondence to the matrix positions and each of them is divided into a P-polarization light component, which is transmitted, and an S-polarization light component, which is reflected. The S-polarized light component, which is reflected by the polarization splitting film, is reflected at the reflecting surface and emerges in the same direction as the P-polarized light component. Meanwhile, the P-polarized light component, which is transmitted through the polarization splitting film, is transmitted through the ½-wave plate and converted to component of the same polarization direction as the S-polarized component. All of the light flux that emerges from the polarization conversion element 4 are thus uniform in polarization direction.

The light flux emerged from the polarization conversion element 4 enters as a divergent light flux into the condenser lens 5 and is converged by the condenser lens 5. The light flux emerged from the condenser lens 5 enters as S-polarized light into the polarization beam splitter 6, is reflected by the polarization splitting film 6a thereof, and reaches the liquid crystal display element 7 through the ¼-wave plate 8. The illumination light is then modulated and reflected by the liquid crystal display element 7.

Here, this embodiment has the structure in which light passes through the ¼-wave plate twice. However, needless to say, a structure in which light passes through a ⅛-wave plate four times is acceptable. Further, a structure in which light passes through each of two ⅛-wave plates twice is acceptable. That is, a structure such that light passes through a component twice, which acts as a ¼-wave plate, as a whole, is acceptable. Needless to say, a structure such that light passes through a component once, which acts as a ½-wave plate, as a whole, is also acceptable.

Of the modulated and reflected light (image light), an S-polarized component is reflected again by the polarization splitting film 6a, returned to the light source side, and eliminated from projection light.

On the other hand, of the modulated image light, a P-polarized component is transmitted through the polarization splitting film 6a, emerges from the polarization beam splitter 6, and are projected by the projection lens 10 onto the unillustrated screen.

Here, since the polarization splitting film 6a of the polarization beam splitter 6 does not have ideal characteristics (S-polarized reflectance Rs=100%, P-polarized reflectance Rp=0%), the S-polarized light among the modulated image light incident on the polarized splitting film 6a at an angle that deviates from a specific angle (45° with respect to the direction of the normal to the polarized splitting film 6a in FIG. 1) is also transmitted.

Thus with the present embodiment, the polarizing plate 9 is disposed between the polarization beam splitter 6 and the projection lens 10 to cut the leakage light that could not be analyzed completely at the polarization beam splitter 6.

Figure 2:
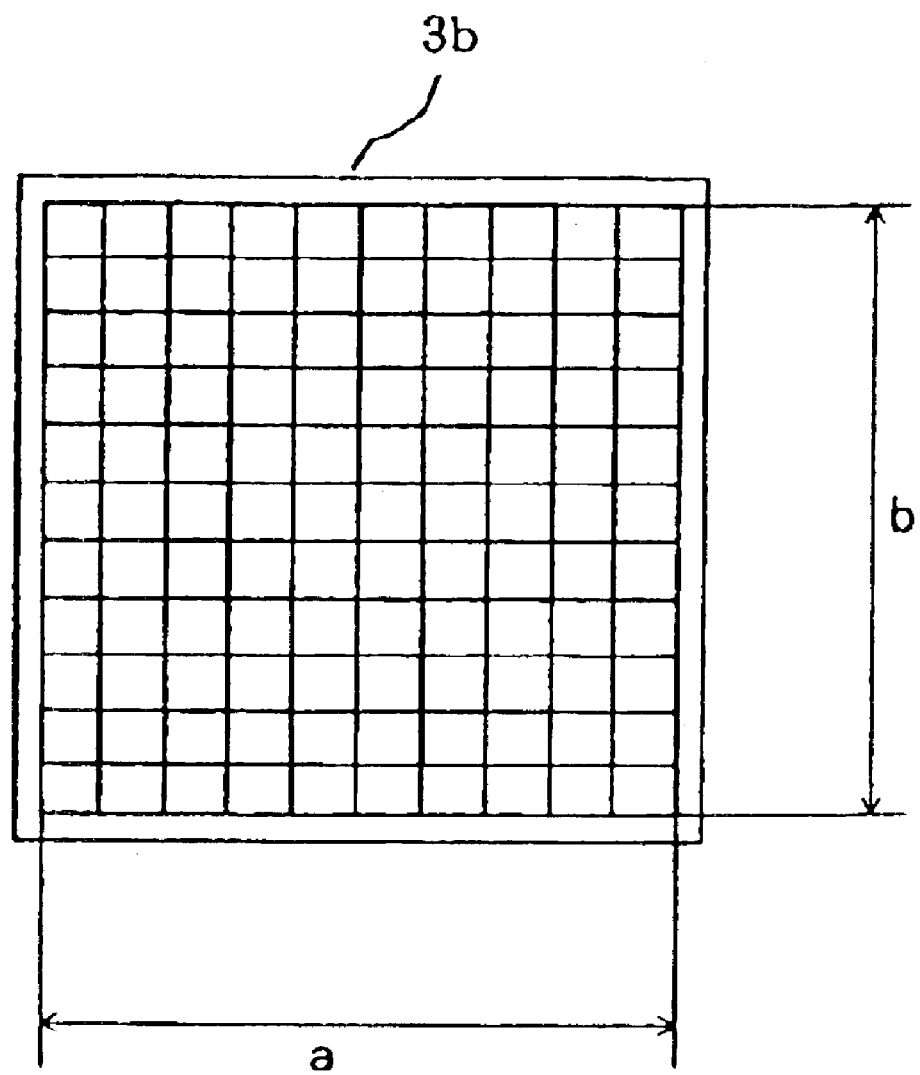
FIG. 2 is a diagram for describing a fly-eye lens array used in the projection type display optical system shown in FIG. 1.

Here, the F number (Fno) of the abovedescribed illumination system can be defined by the convergence angle (maximum incidence angle with respect to an optical axis L of the light flux incident on the polarization splitting film 6a) ψ of the illumination light flux that is converged onto the liquid crystal display element 7, and in the present embodiment, the external shape of the second fly-eye lens array 3b is set as shown in FIG. 2 and its effective range is set as follows:

a=42 mm, b=39 mm and the synthetic focal length fc of the condenser lens 5 is set as follows:

fc=95.8 mm

When $$l = \sqrt{(a^2 + b^2)},$$

the Fno of the illumination optical system (first optical system which is constituted by the elements 1 to 5) is Fno=fc/l=2.33.

Here, the convergence angle q of the illumination light flux will be as follows:

ψ=tan⁻¹(Fno/2)=12.1 degrees.

Figure 22:
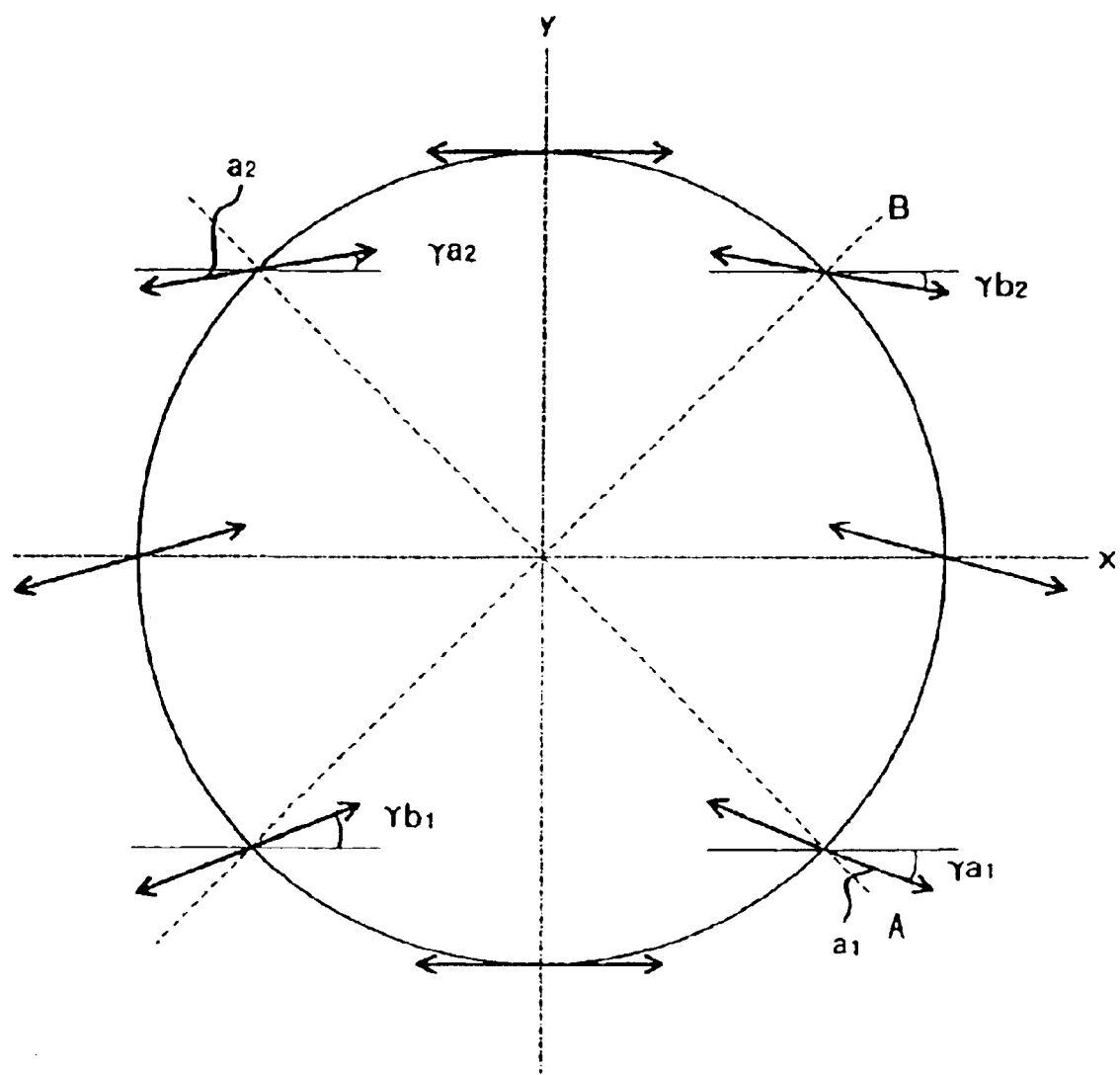
FIG. 22 is a diagram for explaining the reason why leakage light occurs at the polarization splitting film.

The method of calculating the polarization state in a diagonal direction (the direction of A or B shown in FIG. 22) of the illumination light flux shall now be described.

Figure 3:
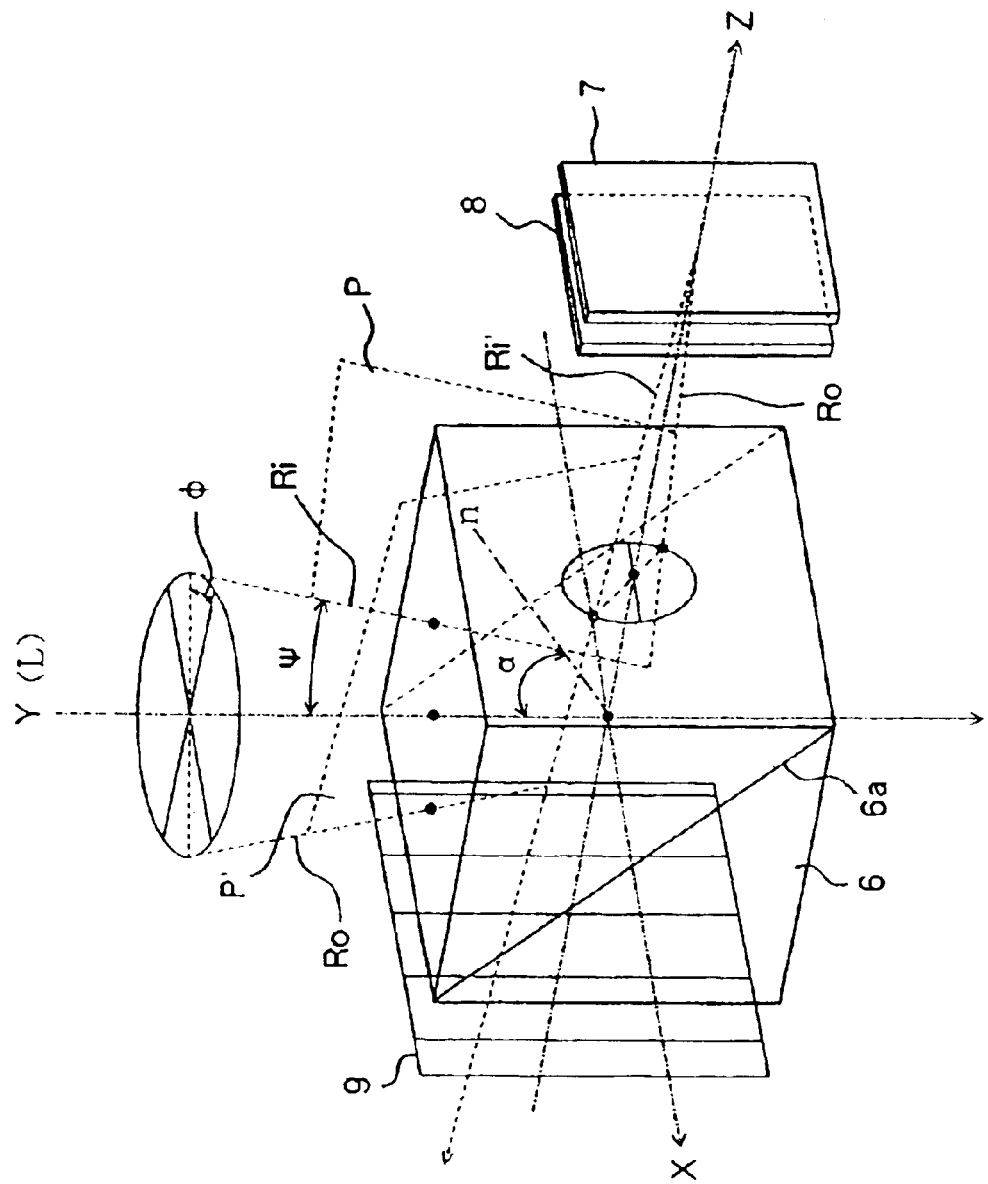
FIG. 3 is an optical path diagram of a polarization beam splitter used in the projection type display optical system shown in FIG. 1.

The optical path of a light ray that is made incident from an abovementioned diagonal direction onto the incidence surface (surface orthogonal to the optical axis L <Y-axis>) of the polarization beam splitter is shown in FIG. 3. Here, Φ is defined as the azimuth that indicates the diagonal direction and ψ is defined as the angle of incidence. Here, the polarization direction of the incident ray is a direction parallel to the X-axis.

The P-polarized component at the polarization splitting film 6a is parallel to a plane P formed by an incident ray Ri and an emergent ray Ro after reflection, and the S-polarized component is perpendicular to the plane P.

Figure 17:
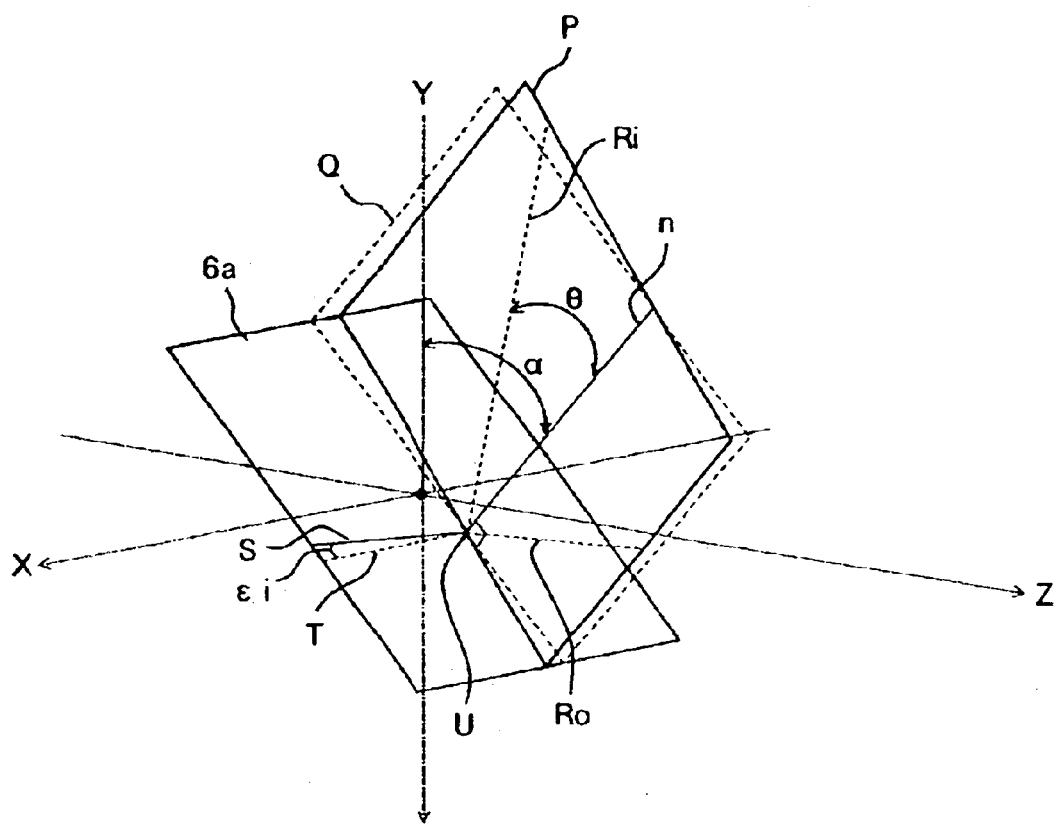
FIG. 17 is a diagram for explaining the polarization directions at a polarization splitting film.

Here, surfaces and polarization directions shall be described using FIG. 17. In FIG. 17, the same items as those of FIG. 3 are provided with the same symbols.

The plane P, which contains the incident ray Ri and the emergent ray Ro, is indicated by thick solid lines. This plane P contains the normal n to the polarization splitting film 6a at the reflection point U on the polarization splitting film 6a.

When Q is defined as a plane, which is parallel to the Y-Z plane and contains the normal n, the polarization direction of the incident ray Ri is a direction perpendicular to the plane Q (a direction parallel to the X-axis). The direction perpendicular to the plane Q at the reflection point U is indicated as T. Since the direction T is contained within the plane of the polarization splitting film 6a, it can be considered as being the polarization direction of a light ray incident on a reflecting plane (polarization splitting film).

Next, since the direction perpendicular to the plane P at the polarization splitting film 6a is the S-polarization direction, the direction perpendicular to the plane P at the reflection point U is indicated as S. Here, since the direction T is the polarization direction of light and the direction S is the S-polarization direction of the reflecting surface, the angle ∈i, which is formed by S and T, indicates the inclination angle of that polarization direction at the polarization splitting film 6a.

Likewise in FIG. 3, the light ray that emerges from the polarization beam splitter 6 is reflected by the liquid crystal display element 7 and enters into the polarization beam splitter 6 again and is lead to the polarization splitting film 6a. The P-polarized component at the polarization splitting film 6a at this point is parallel to the plane P', which is formed by the incident ray Ri' and the emergent ray Ro' after reflection, and the S-polarized component is perpendicular to the plane P'. Here, since the plane P' is inclined with respect to the Y-Z plane, the polarization direction contained in the X-Y plane is inclined with respect to the S-polarization direction of the polarization splitting film 6a. The inclination angle of that polarization direction here shall be indicated as ∈o.

Based on these geometrical relationships, the polarization states shall now be calculated using Jones matrices.

For the polarization coordinate axes to be used for the calculations, a z-axis shall be defined along the light ray that is made incident on and is reflected by the polarization splitting film 6a, an x component shall be defined as the polarization component that is perpendicular to the z-axis and parallel to the plane formed by the z-axis and X-axis, and a y component shall be defined as the polarization component that is perpendicular to the x component.

When the Jones vector for the incident state is given as:

$$Ji = \begin{pmatrix} Jix \\ Jiy \end{pmatrix},$$

the Jones vector for the emergent state is given as:

$$Jo = \begin{pmatrix} Jox \\ Joy \end{pmatrix},$$

and the action at the polarization splitting film 6a is indicated by a Jones matrix Jm1, the incident polarization state can be defined as:

Jix=1 and Jiy=0 and the Jones matrix Jm1 at the polarization splitting film 6a will be as follows:

$$Jm1 = \begin{pmatrix} \cos\varepsilon i & -\sin\varepsilon i \\ \sin\varepsilon i & \cos\varepsilon i \end{pmatrix} \begin{pmatrix} Ji11 & Ji12 \\ Ji21 & Ji22 \end{pmatrix} \begin{pmatrix} \cos\varepsilon i & \sin\varepsilon i \\ -\sin\varepsilon i & \cos\varepsilon i \end{pmatrix} \quad (a)$$

Where, Ji11=0
Ji12=Rse$^i$δ
Ji21=Rpe$^{-i}$δ
Ji22=0
Rp is the amplitude reflectance of the P-polarized component,
Rs is the amplitude reflectance of the S-polarized component,
and δ is the phase difference of the P-polarized component and the S-polarized component in the reflection process (a phase difference of 180° or −180° indicates a state of no phase difference).

By the above, the polarization state of the emergent state is calculated as:

Jo=Jm1×Ji.

Next, the phase of the x component of the light ray lags by 90° (π/2) due to the ¼-wave plate 8, the phase of the x component lags by 180° (π) due to inversion of the phase of the x direction by reflection at the image display element 7, and the phase of the x component lags by 90° (π/2) again due to the ¼-wave plate 8.

This can be expressed by a Jones matrix Jm2 as follows:

Jm2=Jr×Jmr×Jr

Where, Jr expresses the action of the ¼-wave plate 8 and $$Jr = \begin{pmatrix} Jr11 & Jr12 \\ Jr21 & Jr22 \end{pmatrix}$$

Jr11=0
Jr12=Rse$^i$π/2
Jr21=Rpe$^{-i}$π/2
Jr22=0.

Also, Jmr expresses the action of reflection and is given as:

$$Jmr = \begin{pmatrix} Jm11 & Jm12 \\ Jm21 & Jm22 \end{pmatrix}$$

Jm11=0
Jm12=Rse$^i$π
Jm21=Rpe$^{-i}$π
Jm22=0.

When the polarization state Ji' of the light that is made incident again onto the polarization beam splitter 6 is expressed using Jones vectors as follows: When, $$Ji' = \begin{pmatrix} Jix' \\ Jiy' \end{pmatrix},$$

the polarization state is calculated as:

Ji'=Jr×Jmr×Jr×Jo

For the re-incidence of light onto the polarization beam splitter 6, the action of the polarization splitting film 6a can be expressed as follows by Jm2 using the inclination angle ϵo of the plane P' as in Expression (a):

$$Jm2 = \begin{pmatrix} \cos\varepsilon o & -\sin\varepsilon o \\ \sin\varepsilon o & \cos\varepsilon o \end{pmatrix} \begin{pmatrix} Ji11' & Ji12' \\ Ji21' & Ji22' \end{pmatrix} \begin{pmatrix} \cos\varepsilon o & \sin\varepsilon o \\ -\sin\varepsilon o & \cos\varepsilon o \end{pmatrix} \quad (b)$$

Where, Ji11'=0
Ji12'=Tse$^i$δ'
Ji21'=Tpe$^{-i}$δ'
Ji22'=0
Tp is the amplitude transmittance of the P-polarized component, Ts is the amplitude transmittance of the S-polarized component, and δ' is the phase difference of the P-polarized component and the S-polarized component in the transmission process.

By the above, the polarization state of the light ray that is transmitted through and emerges from the polarization beam splitter 6 is calculated as:

Jo'=Jm2×Ji'

Lastly, since the polarization plate that is provided for analysis can be expressed as:

$$Jp = \begin{pmatrix} 1 & 0 \\ 0 & 0 \end{pmatrix},$$

the leakage light becomes:

$$Jp \times Jo' = \begin{pmatrix} 1 & 0 \\ 0 & 0 \end{pmatrix} \begin{pmatrix} Jox' \\ Joy' \end{pmatrix} = \begin{pmatrix} Jox' \\ 0 \end{pmatrix},$$

so that Jox' expresses the leakage light amount.

For a light ray, which, among the abovementioned illumination light flux of Fno 2.3, is made incident at an angle of 11 degrees, corresponding to approximately 90% of the entire light flux angle, the inclinations ϵi and ϵo of the polarization directions at the polarization splitting film 6a will be −6° and +2°, respectively, when the refractive index of the polarization beam splitter 6 is 1.74.

Here, the light ray that enters into the polarization beam splitter 6 at 11 degrees is tilted by 6.3 degrees with respect to the Y-axis due to refraction in the actual polarization beam splitter 6 and the incidence angle θ with respect to the normal n of the light ray Ri that is incident on the polarization splitting film 6a is 40.6 degrees.

Figure 4:
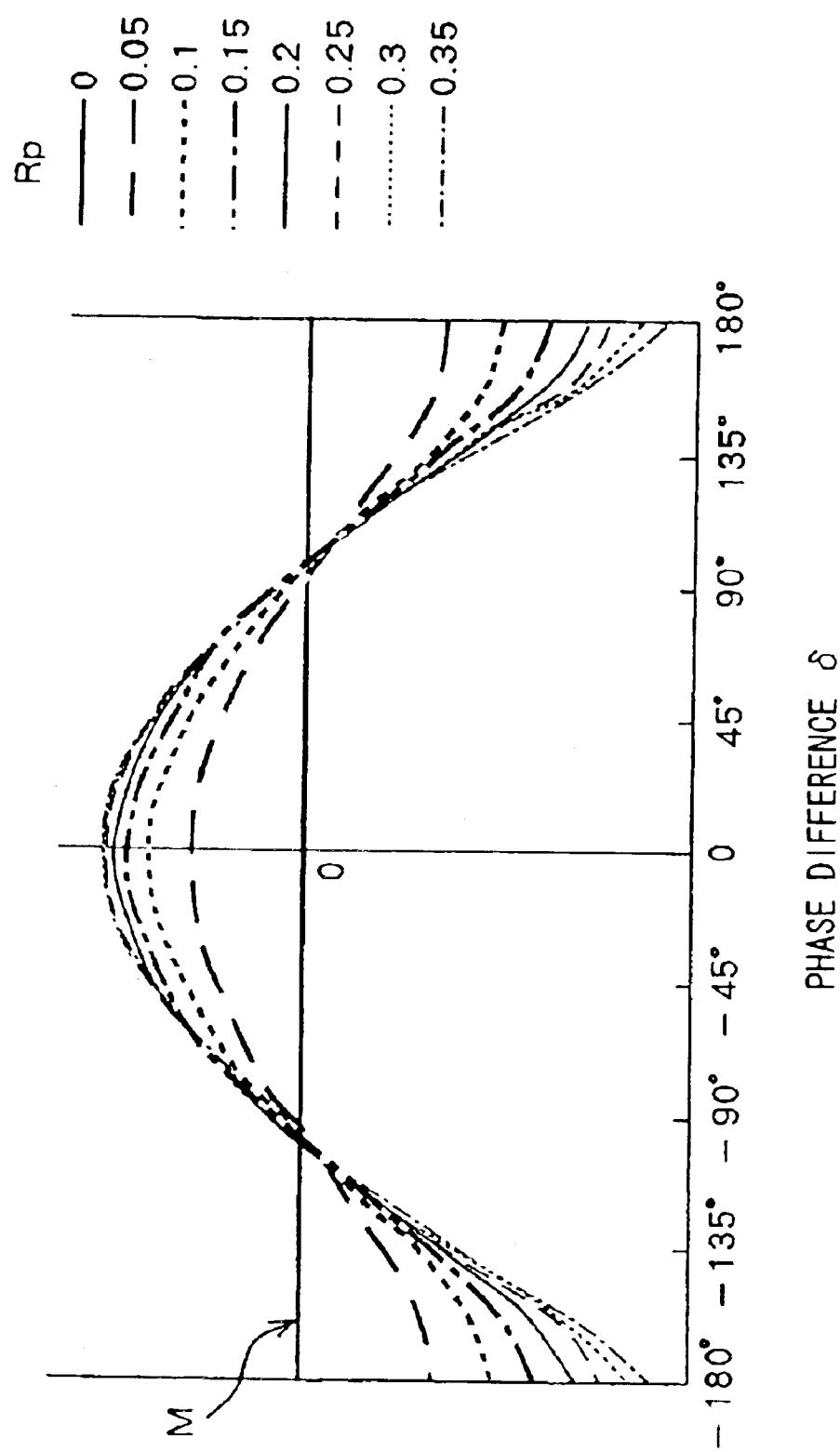
FIG. 4 is a diagram showing the results of calculating the leakage light amount at the polarization beam splitter.

FIG. 4 shows the results of calculating the leakage light Jox' upon setting the S-polarized light amplitude reflectance Rs=1, setting the S-polarized light amplitude transmittance Ts=0, setting the P-polarized light amplitude transmittance Tp=1−Rp by using the P-polarized amplitude reflectance Rp, setting the transmittance phase difference δ'=0, and using Rp and δ as parameters.

In FIG. 4, though the polarization splitting film 6a has ideal characteristics when Rp=0, as has been described up until now, a certain amount of leakage light (shown as "M" in the figure) occurs due to the inclination of the polarization splitting film 6a.

Meanwhile, when Rp>0, the amount of the leakage light varies in accordance with the phase difference δ, and at δ=180° (−180°), the leakage light amount becomes minimized and even less than when the characteristics are ideal. The leakage light amount also varies in accordance with Rp and decreases as Rp increases.

FIG. 4 shows that when Rp is greater than 0 and the phase difference δ is greater than 120 degrees (or less than −120 degrees), the leakage light amount becomes less than the leakage light amount for a polarization splitting film with ideal characteristics.

In this Embodiment, the polarization splitting film 6a is constituted so as to satisfy the following condition with δ being the phase difference of the P-polarized light and the S-polarized light at the polarization splitting film 6a:

$$120°≤|δ|≤180°. \quad (1)$$

This structure enables reduction of the components of the P-polarization direction that are contained in the polarized light, which is analyzed upon being incident on the polarization splitting film in an inclined manner with respect to the optical axis of the illumination optical system, and thus enables reduction of the amount of the leakage light, which could not be eliminated by analysis at the polarization splitting film in the prior art. The contrast of the projected image can thus be improved.

In addition to the conditional expression (1) above, the polarization splitting film 6a may be arranged so that the following condition is satisfied with Rp being the reflectance of P-polarized light at the polarization splitting film 6a for light that is incident on the polarized splitting film 6a at an angle θ with respect to the normal to the polarization splitting film 6a:

$$Rp>0\%. \quad (2)$$

The abovementioned incidence angle θ satisfies the following condition, wherein α is the angle formed by the optical axis leading from the illumination optical system to the polarization splitting 6a film and the normal to the polarization splitting film 6a, and ψ is the maximum incidence angle of the light flux onto the polarization splitting film 6a with respect to the optical axis leading from the illumination optical system to the polarization splitting film 6a:

$$α−ψ≤α+ψ. \quad (3)$$

The above shall now be described in more detail using FIGS. 26 to 30.

Figure 26:
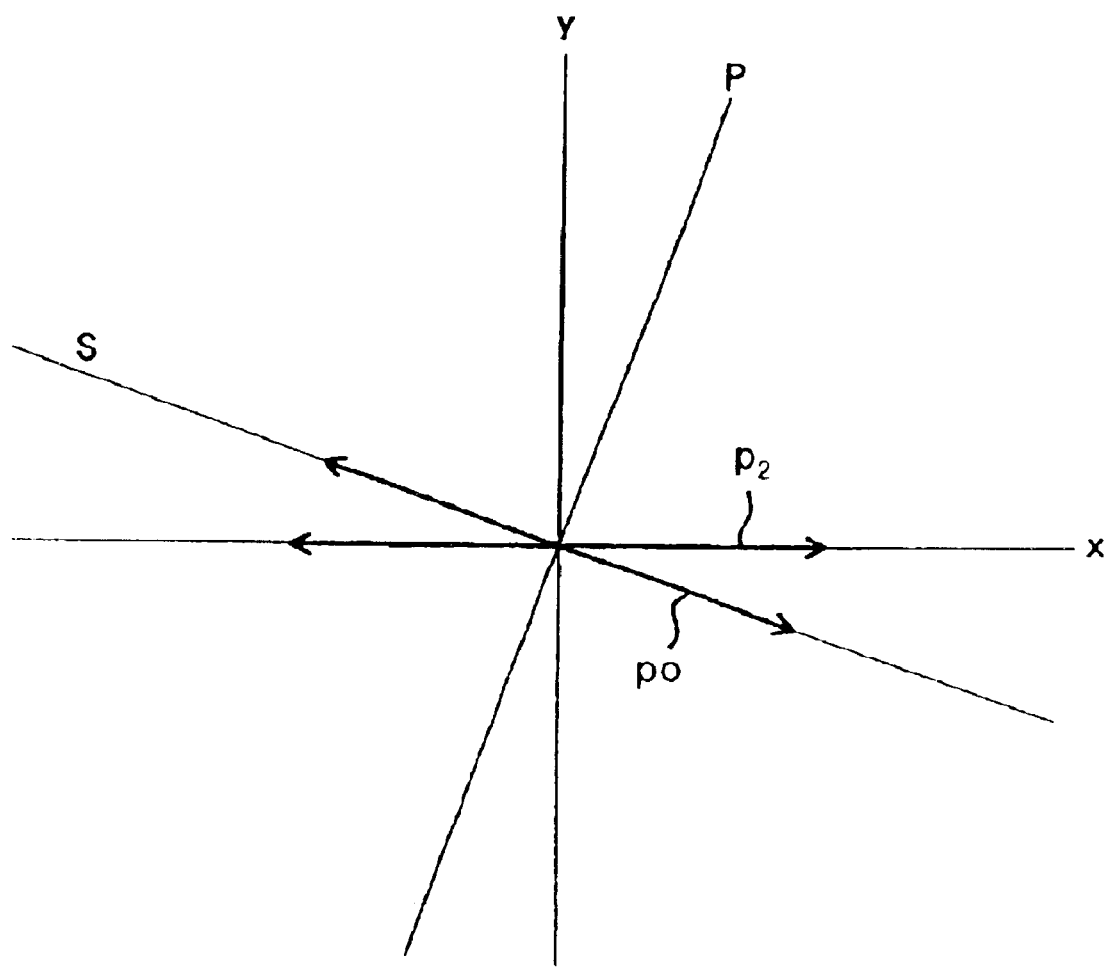
FIG. 26 is a diagram for explaining the reason why leakage light is lessened at the polarization splitting film in Embodiment 1.
Figure 27:
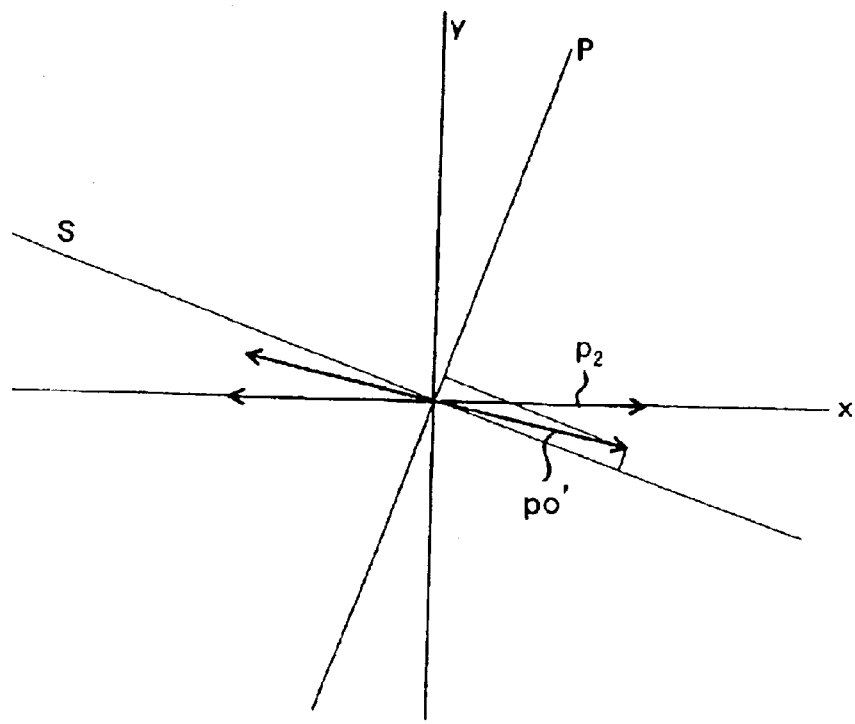
FIG. 27 is a diagram for explaining the reason why leakage light is lessened at the polarization splitting film in Embodiment 1.

In FIG. 26, the x-axis is set in the polarization direction $p_2$ of a light ray that is made incident as illumination light onto polarization splitting film 6a. When in this case, the S-axis is the S-polarization direction in the polarization splitting film, the P-axis is the P-polarization direction, and the polarization splitting film has ideal characteristics, the polarization direction po of the light ray that emerges the polarization beam splitter 6 is a direction along the S-axis.

On the other hand, when the characteristics of the polarization splitting film 6a are set so that Rp>0%, a polarization component of the P-polarization direction is contained in the reflected light and the polarization direction po' of the light that emerges from the polarization beam splitter 6 is the synthetic direction of those of the polarization component of the S direction and the polarization component of the P direction.

Figure 23:
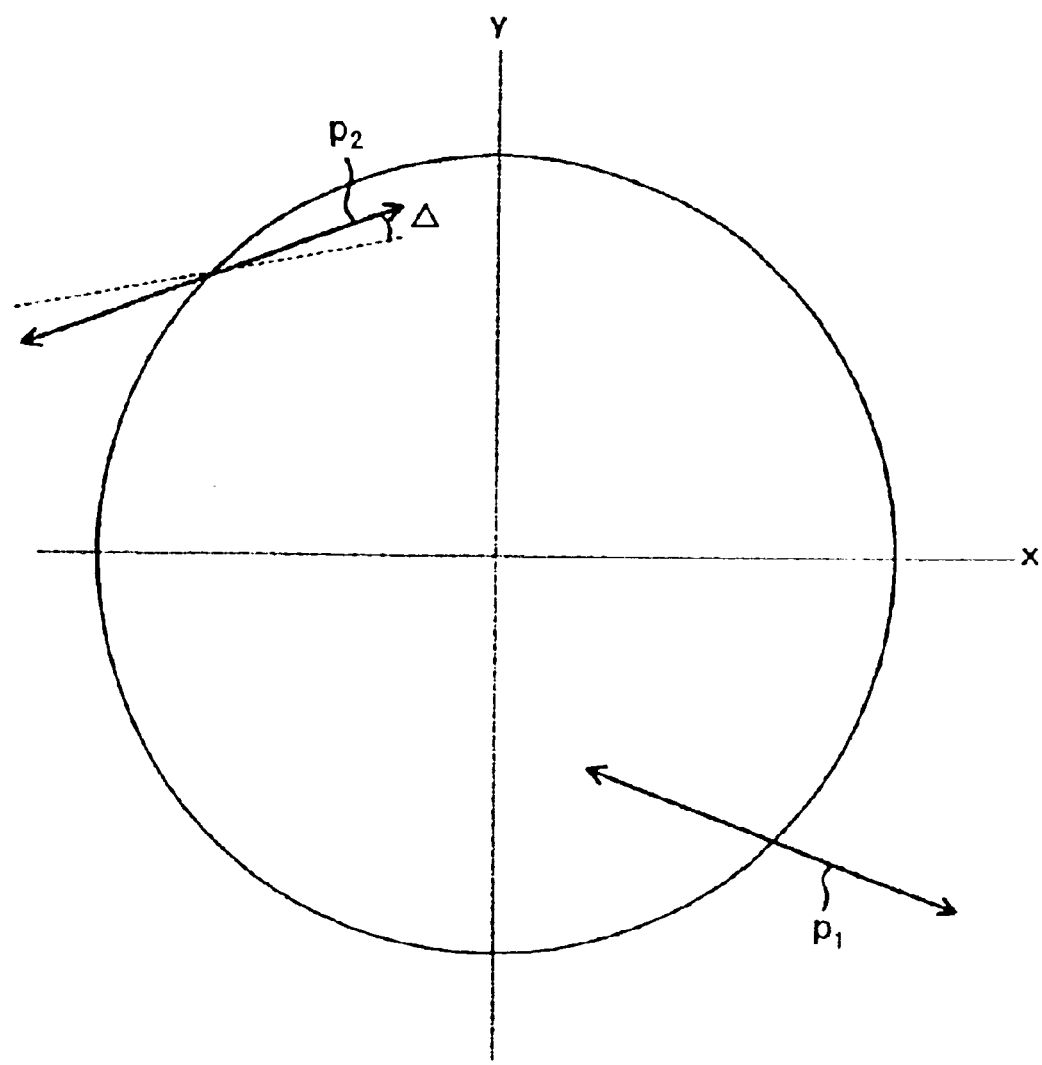
FIG. 23 is a diagram for explaining the reason why leakage light occurs at the polarization splitting film.
Figure 24:
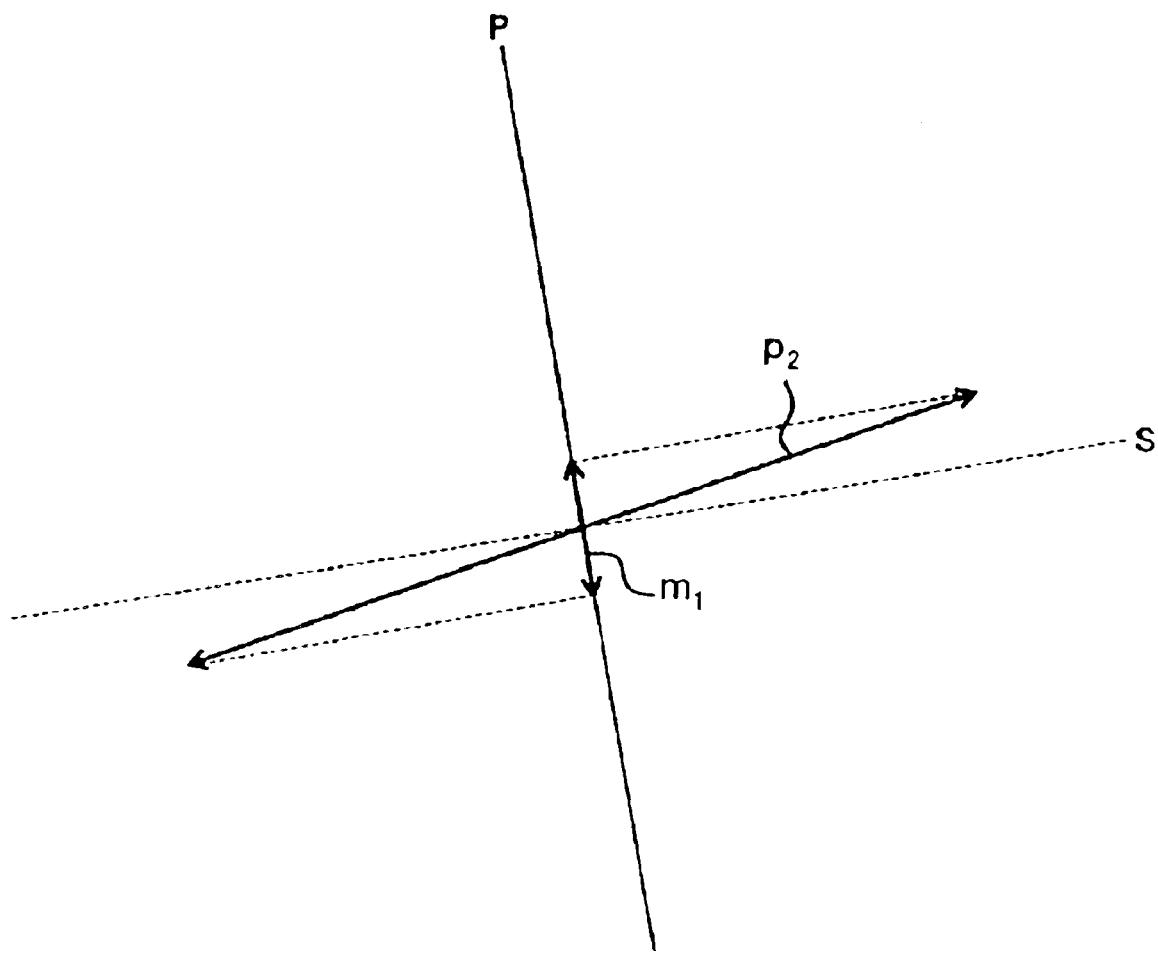
FIG. 24 is a diagram for explaining the reason why leakage light occurs at the polarization splitting film.
Figure 25:
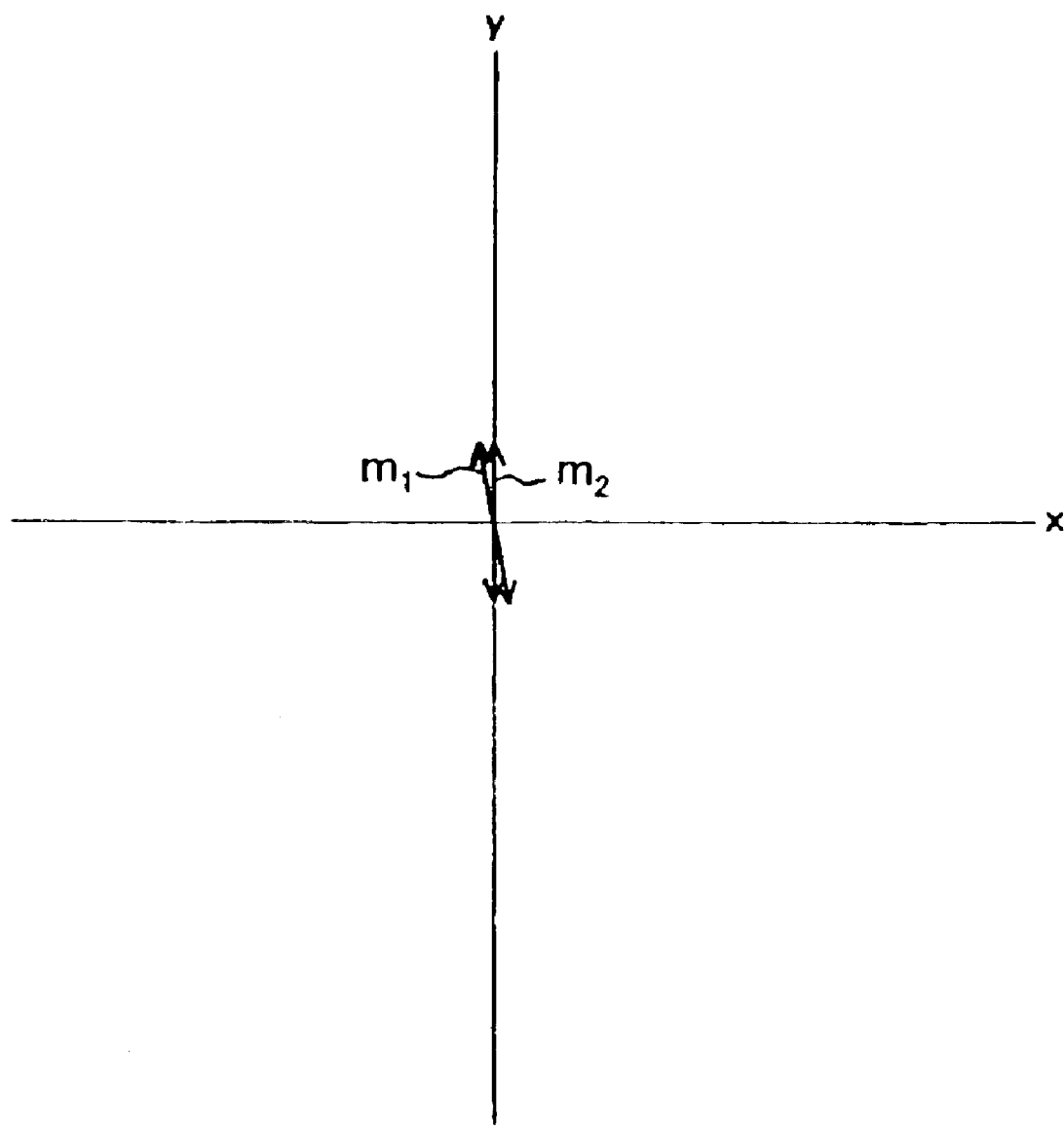
FIG. 25 is a diagram for explaining the reason why leakage light occurs at the polarization splitting film.
Figure 28:
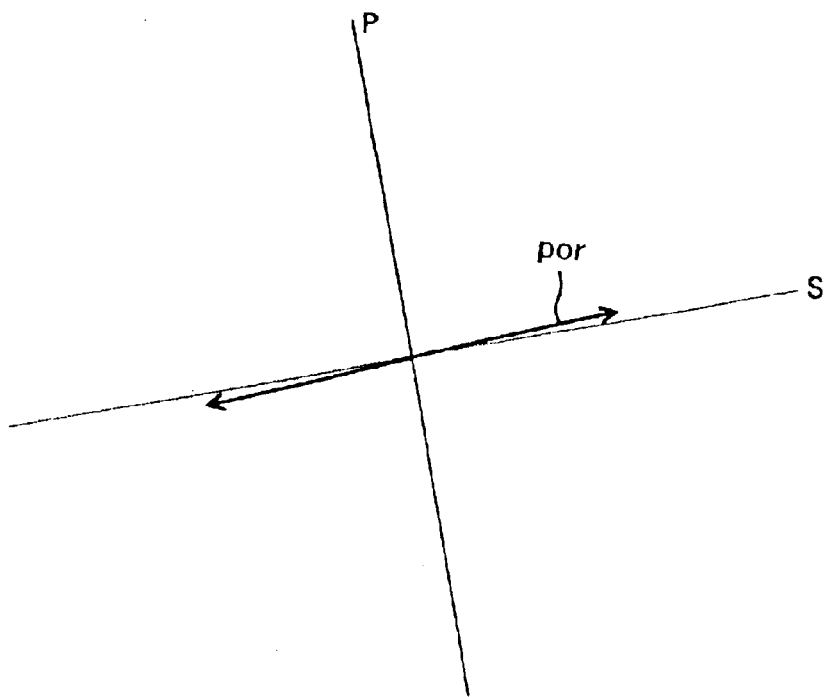
FIG. 28 is a diagram for explaining the reason why leakage light is lessened at the polarization splitting film in Embodiment 1.

The polarization direction por, resulting from the inversion of the polarization direction po' upon twice passage through the ¼-wave plate 8, is shown in FIG. 28. As shown the figure, the polarization direction por can be made close to the S-polarization direction (indicated by the dotted line S in FIG. 28) at the polarization splitting film in the process of analysis at the polarization beam splitter illustrated priorly in FIG. 23.

Since the component in the P-polarization direction in the analysis process is thereby decreased, the leakage light amount at the polarization splitting film 6a is decreased.

Figure 29:
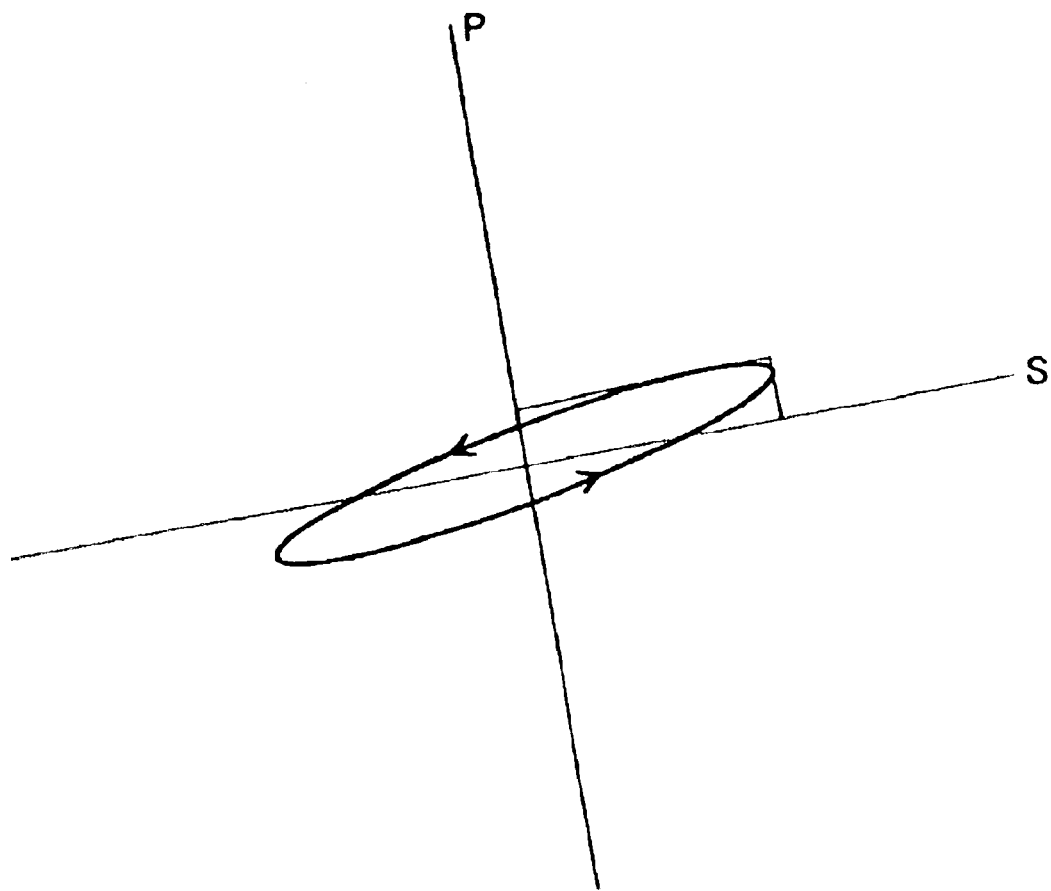
FIG. 29 is a diagram for explaining the reason why leakage light is lessened at the polarization splitting film in the Embodiment 1.
Figure 30:
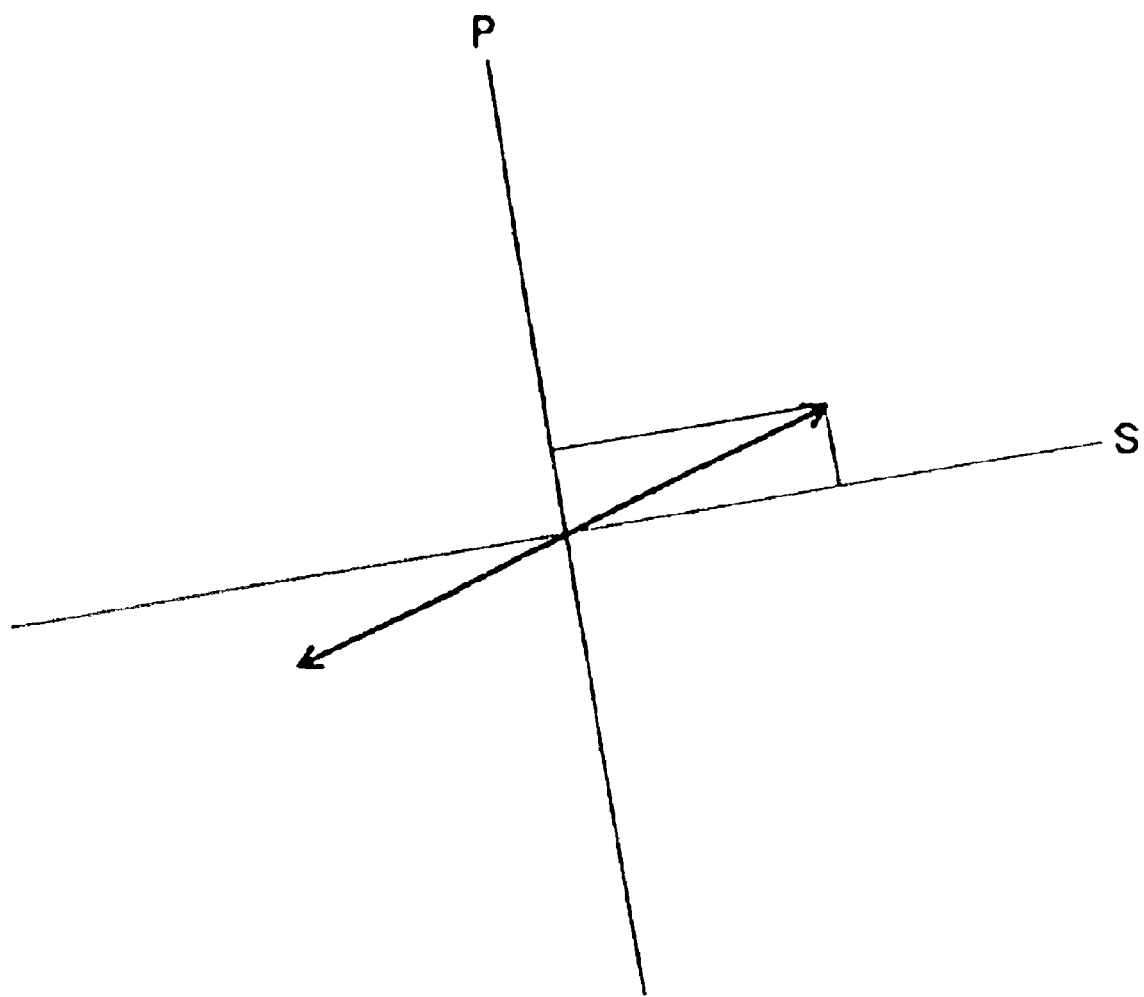
FIG. 30 is a diagram for explaining the reason why leakage light is lessened at the polarization splitting film in Embodiment 1.

Here, when the phase difference of the P-polarized light and the S-polarized light at the point of reflection on the polarization splitting film 6a is 180° (π) or −180° (−π), the polarization state by which the leakage light amount is lessened as shown in FIG. 28 is achieved. However, when the phase difference at the polarization splitting film is 90° (π/2), the polarization state is as shown in FIG. 29 and when the phase difference is 0°, the polarization state is as shown in FIG. 30 and since a P-polarized component arises in the process of analysis by the polarization splitting film again, it is preferable to set the phase difference within the range expressed by the conditional expression (1).

By thus arranging the polarization splitting film 6a so that the direction of polarization (direction of the major axis in the case of elliptical polarization) of a polarized light, which is incident on the polarization splitting film 6a from a direction that deviates from a specific direction (the direction inclined by 45° with respect to the normal to the polarization splitting film 6a) and is reflected by the polarization splitting film 6a, is between: (i) the polarization direction of polarized light that is reflected at the polarization splitting film 6a, which is determined based on the geometrical relationship of the polarization splitting film 6a and the direction of incidence of polarized light on the polarization splitting film 6a, and (ii) the polarization direction of polarized light, after the polarized light has been incident on the polarization splitting film 6a at the angle θ with respect to the normal to polarization splitting film 6a and at a second azimuth angle which is directly opposite to the first azimuth, and has been reflected at the polarization splitting film 6a and then has passed through a ½-wave plate, the leakage light at the polarization beam splitter 6 can be reduced.

In particular, it is preferable for the above condition to be met for light rays that are incident on the polarization splitting film 6a at incidence angles that are smaller than the angle formed by the incidence surface (surface orthogonal to the optical axis L) or the emergence surface of the polarization beam splitter 6 and the polarization-splitting film 6a.

It is favorable for the angle formed by the incidence surface or emergence surface of the polarization beam splitter 6 and the polarization splitting film 6a to be 45° since the polarization beam splitter 6 can then be made most compact in this case.

Numerical examples which express arrangements of the polarization splitting film that satisfy the conditions of reducing the leakage light at the polarization beam splitter 6 shall now be indicated.

<<Numerical Example 1>>

Table 1 shows Numerical Example 1 of a polarization splitting film constituted by fifteen film layers, used in the present invention's polarization beam splitting optical system.

TABLE 1

|  | Thickness (nm) | Refractive index |
| --- | --- | --- |
| Substrate |  | 1.75 |
| Layer 1 | 149 | 1.631 |
| Layer 2 | 130 | 2.364 |
| Layer 3 | 71 | 1.463 |
| Layer 4 | 132 | 2.364 |
| Layer 5 | 133 | 1.463 |
| Layer 6 | 120 | 2.364 |
| Layer 7 | 172 | 1.463 |
| Layer 8 | 42 | 2.364 |
| Layer 9 | 168 | 1.463 |
| Layer 10 | 72 | 2.364 |
| Layer 11 | 143 | 1.463 |
| Layer 12 | 27 | 2.364 |
| Layer 13 | 247 | 1.463 |
| Layer 14 | 16 | 2.364 |
| Layer 15 | 169 | 1.463 |
| Adhesive agent |  | 1.51 |

Figure 5:
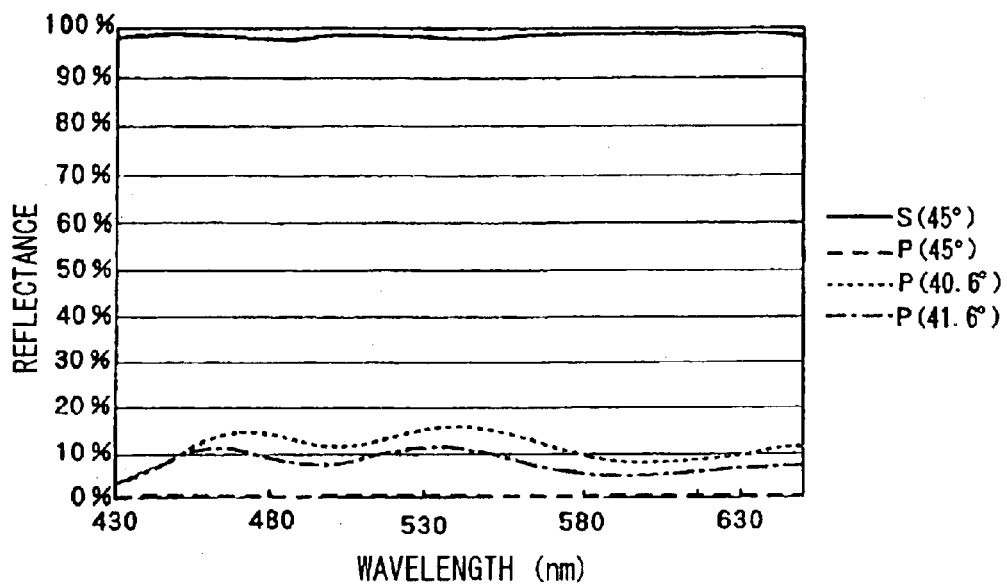
FIG. 5 is a diagram showing the polarization splitting characteristics of Numerical Example 1 of the present invention.
Figure 6:
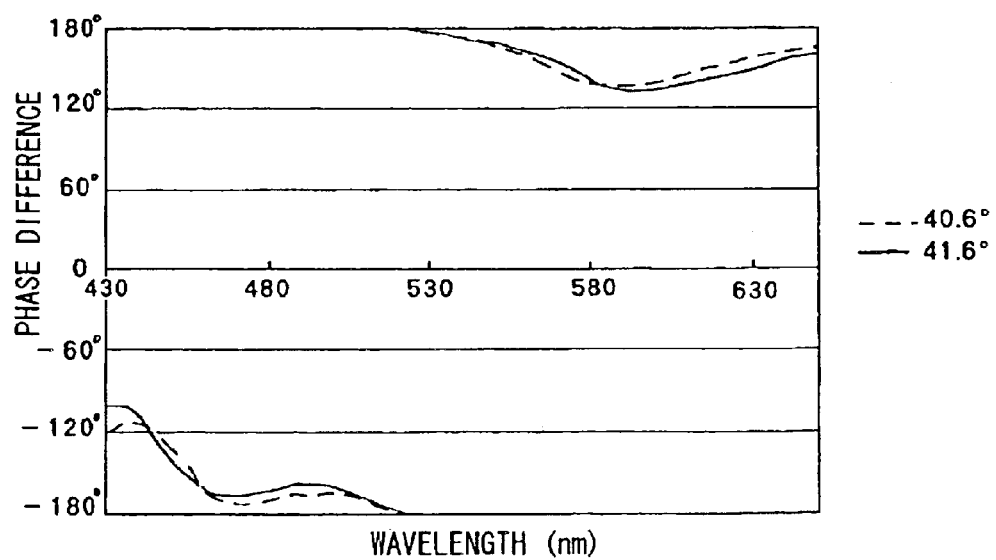
FIG. 6 is a diagram showing the phase difference characteristics of Numerical Example 1 of the present invention.

FIG. 5 shows, for Numerical Example 1, the reflectances of P-polarized light and S-polarized light for an incidence angle of 45° and the reflectances of P-polarized light for incidence angles of 40.6° and 41.6° (corresponding to θ), which are incidence angles of light rays corresponding to substantially 90% and 70% in a diagonal direction for Fno 2.3, and FIG. 6 shows the phase differences of the P-polarized light and the S-polarized light at the polarization splitting film for the incidence angles of 40.6° and 41.6°.

<<Numerical Example 2>>

Table 2 shows Numerical Example 2 of a polarization splitting film constituted by fourteen film layers, used in the present invention's polarization beam splitting optical system.

TABLE 2

|  | Thickness (nm) | Refractive index |
| --- | --- | --- |
| Substrate |  | 1.75 |
| Layer 1 | 117 | 2.331 |
| Layer 2 | 75 | 1.461 |
| Layer 3 | 123 | 2.331 |
| Layer 4 | 123 | 1.461 |
| Layer 5 | 109 | 2.331 |
| Layer 6 | 127 | 1.461 |
| Layer 7 | 81 | 2.331 |
| Layer 8 | 173 | 1.461 |
| Layer 9 | 28 | 2.331 |
| Layer 10 | 168 | 1.461 |
| Layer 11 | 49 | 2.331 |
| Layer 12 | 114 | 1.461 |
| Layer 13 | 35 | 2.331 |
| Layer 14 | 118 | 1.461 |
| Adhesive agent |  | 1.51 |

Figure 7:
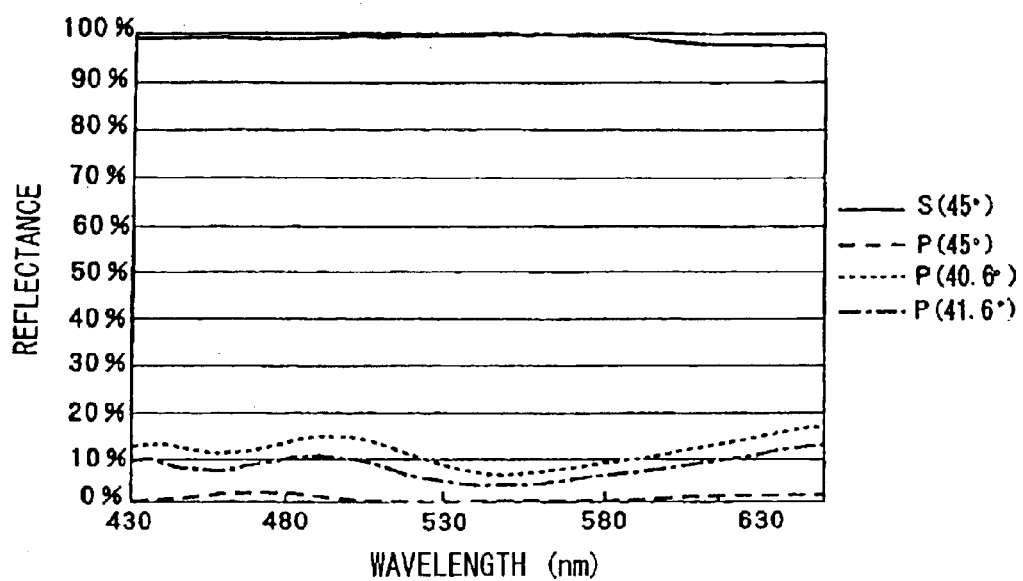
FIG. 7 is a diagram showing the polarization splitting characteristics of Numerical Example 2 of the present invention.
Figure 8:
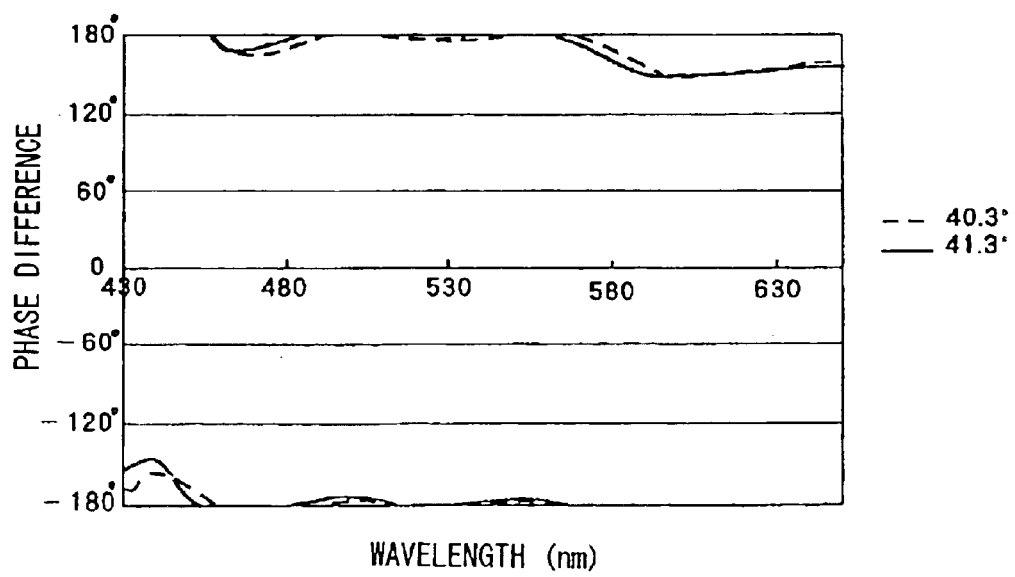
FIG. 8 is a diagram showing the phase difference characteristics of Numerical Example 2 of the present invention.

FIG. 7 shows, for Numerical Example 2, the reflectances of P-polarized light and S-polarized light for an incidence angle of 45° and the reflectances of P-polarized light for incidence angles of 40.6° and 41.6°, which are incidence angles of light rays corresponding to substantially 90% and 70% in a diagonal direction for Fno 2.3. FIG. 8 shows the phase differences of the P-polarized light and the S-polarized light at the polarization splitting film for the incidence angles of 40.6° and 41.6°.

<<Numerical Example 3>>

Table 3 shows Numerical Example 3 of a polarization splitting film constituted by fifteen film layers, used in the present invention's polarization beam splitting optical system. This Numerical Example is a Numerical Example for the case where the refractive index of the glass of the polarization beam splitter is 1.6.

TABLE 3

|  | Thickness (nm) | Refractive index |
| --- | --- | --- |
| Substrate |  | 1.61 |
| Layer 1 | 168 | 1.462 |
| Layer 2 | 145 | 2.068 |
| Layer 3 | 101 | 1.382 |
| Layer 4 | 149 | 2.068 |
| Layer 5 | 138 | 1.382 |
| Layer 6 | 141 | 2.068 |
| Layer 7 | 140 | 1.382 |
| Layer 8 | 77 | 2.068 |
| Layer 9 | 125 | 1.462 |
| Layer 10 | 75 | 2.068 |
| Layer 11 | 138 | 1.382 |
| Layer 12 | 71 | 2.068 |
| Layer 13 | 133 | 1.382 |
| Layer 14 | 65 | 2.068 |
| Layer 15 | 92 | 1.462 |
| Adhesive agent |  | 1.51 |

Figure 9:
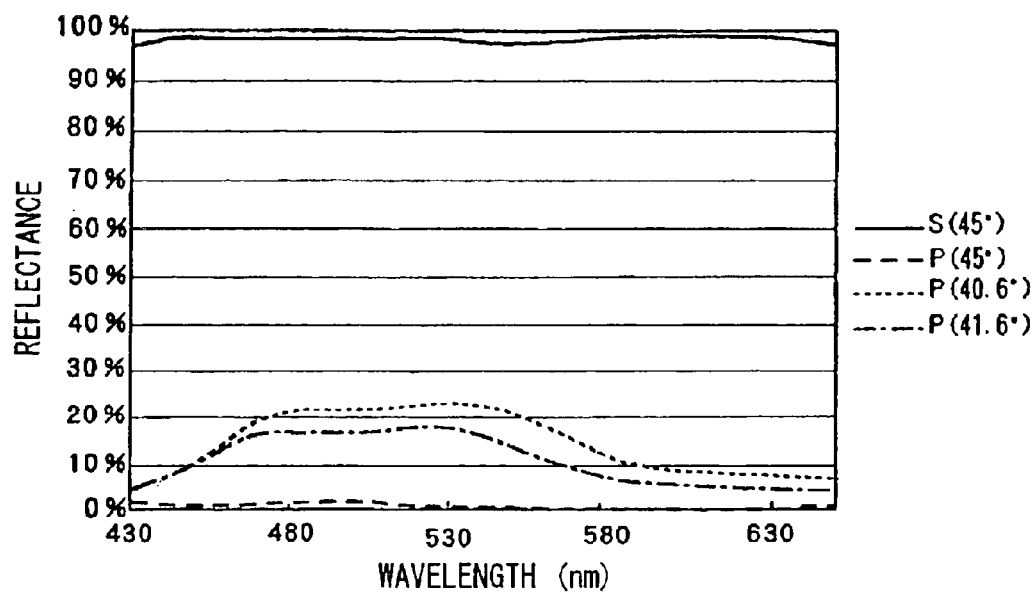
FIG. 9 is a diagram showing the polarization splitting characteristics of Numerical Example 3 of the present invention.
Figure 10:
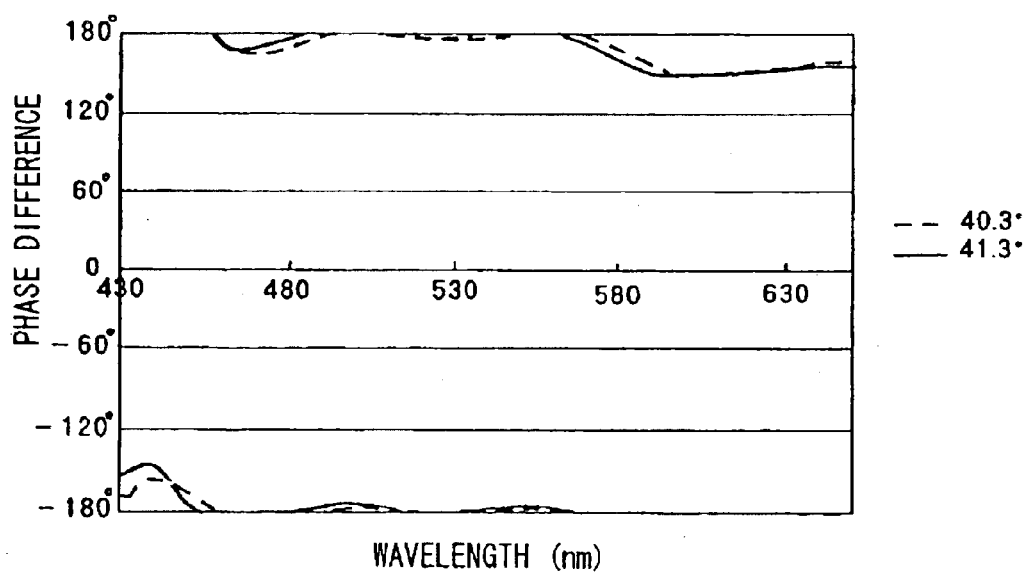
FIG. 10 is a diagram showing the phase difference characteristics of Numerical Example 3 of the present invention.

FIG. 9 shows, for Numerical Example 3, the reflectances of P-polarized light and S-polarized light for an incidence angle of 45° and the reflectances of P-polarized light for incidence angles of 40.3° and 41.3°, which are incidence angles of light rays corresponding to substantially 90% and 70% in a diagonal direction for Fno 2.3. FIG. 10 shows the phase differences of the P-polarized light and the S-polarized light at the polarization splitting film for the incidence angles of 40.3° and 41.3°.

<<Numerical Example 4>>

Table 4 shows Numerical Example 4 of a polarization splitting film constituted by fifteen film layers, used in the present invention's polarization beam splitting optical system.

TABLE 4

|  | Thickness (nm) | Refractive index |
| --- | --- | --- |
| Substrate |  | 1.61 |
| Layer 1 | 172 | 1.462 |
| Layer 2 | 141 | 2.068 |
| Layer 3 | 133 | 1.382 |
| Layer 4 | 145 | 2.068 |
| Layer 5 | 137 | 1.382 |
| Layer 6 | 135 | 2.068 |
| Layer 7 | 151 | 1.382 |
| Layer 8 | 76 | 2.068 |
| Layer 9 | 125 | 1.462 |
| Layer 10 | 74 | 2.068 |
| Layer 11 | 139 | 1.382 |
| Layer 12 | 71 | 2.068 |
| Layer 13 | 132 | 1.382 |
| Layer 14 | 65 | 2.068 |
| Layer 15 | 97 | 1.462 |
| Adhesive agent |  | 1.51 |

Figure 11:
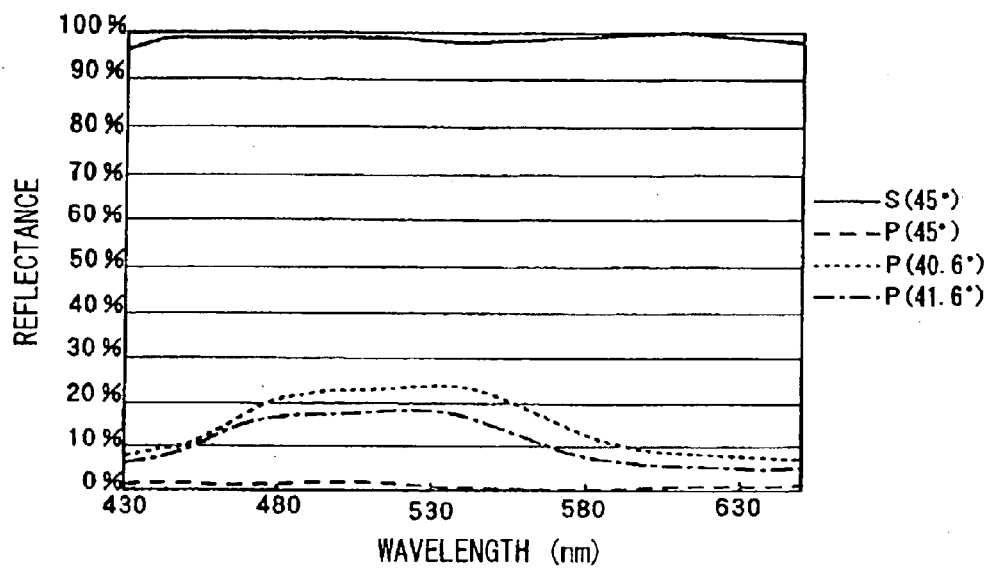
FIG. 11 is a diagram showing the polarization splitting characteristics of Numerical Example 4 of the present invention.
Figure 12:
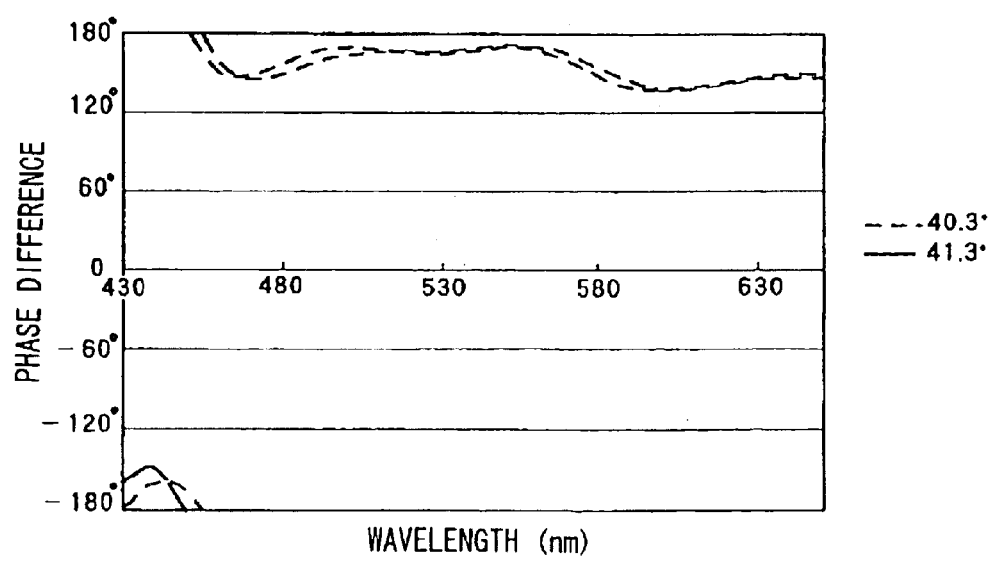
FIG. 12 is a diagram showing the phase difference characteristics of Numerical Example 4 of the present invention.

FIG. 11 shows, for Numerical Example 4, the reflectances of P-polarized light and S-polarized light for an incidence angle of 45° and the reflectances of P-polarized light for incidence angles of 40.3° and 41.3°, which are incidence angles of light rays corresponding to substantially 90% and 70% in a diagonal direction for Fno 2.3. FIG. 12 shows the phase differences of the P-polarized light and the S-polarized light at the polarization splitting film for the incidence angles of 40.3° and 41.3°.

<<Numerical Example 5>>

Table 5 shows Numerical Example 5 of a polarization splitting film constituted by fifteen film layers, used in the present invention's polarization beam splitting optical system.

TABLE 5

|  | Thickness (nm) | Refractive index |
|---|---|---|
| Substrate |  | 1.61 |
| Layer 1 | 163 | 1.462 |
| Layer 2 | 143 | 2.068 |
| Layer 3 | 139 | 1.382 |
| Layer 4 | 144 | 2.068 |
| Layer 5 | 132 | 1.382 |
| Layer 6 | 116 | 2.068 |
| Layer 7 | 204 | 1.382 |
| Layer 8 | 74 | 2.068 |
| Layer 9 | 125 | 1.462 |
| Layer 10 | 72 | 2.068 |
| Layer 11 | 139 | 1.382 |
| Layer 12 | 69 | 2.068 |
| Layer 13 | 131 | 1.382 |
| Layer 14 | 65 | 2.068 |
| Layer 15 | 108 | 1.462 |
| Adhesive agent |  | 1.51 |

Figure 13:
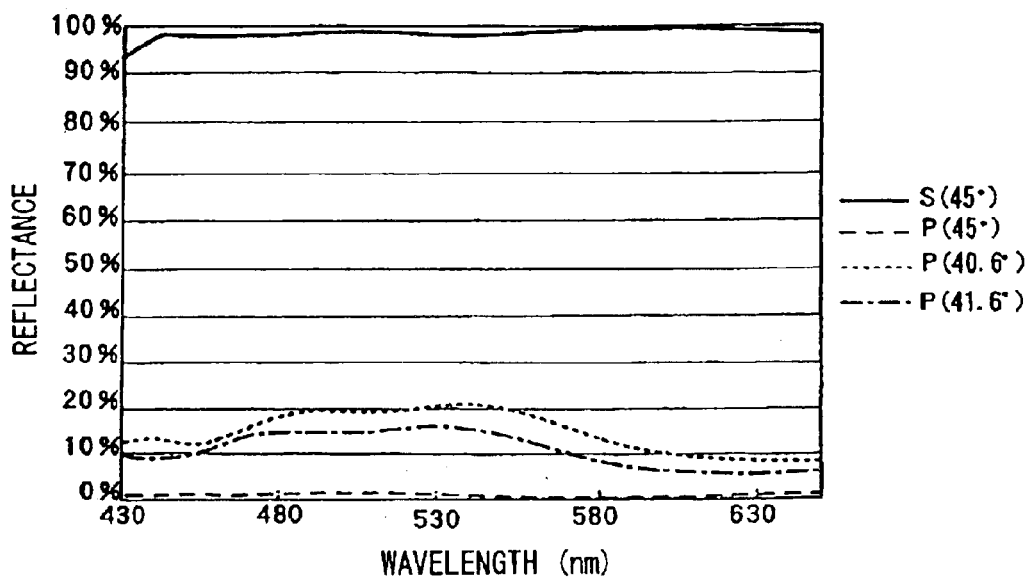
FIG. 13 is a diagram showing the polarization splitting characteristics of Numerical Example 5 of the present invention.
Figure 14:
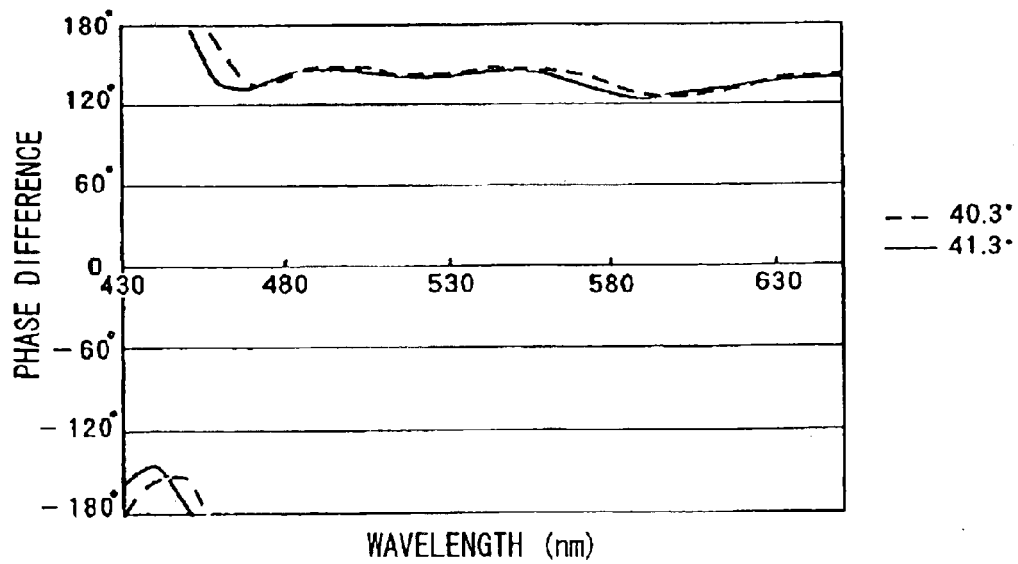
FIG. 14 is a diagram showing the phase difference characteristics of Numerical Example 5 of the present invention.

FIG. 13 shows, for Numerical Example 5, the reflectances of P-polarized light and S-polarized light for an incidence angle of 45° and the reflectances of P-polarized light for incidence angles of 40.3° and 41.3°, which are incidence angles of light rays corresponding to substantially 90% and 70% in a diagonal direction for Fno 2.3. FIG. 14 shows the phase differences of the P-polarized light and the S-polarized light at the polarization splitting film for the incidence angles of 40.3° and 41.3°.

<<Numerical Example 6>>

Table 6 shows Numerical Example 6 of a polarization splitting film used in the present invention's polarization beam splitting optical system.

TABLE 6

|  | Thickness (nm) | Refractive index |
|---|---|---|
| Substrate |  | 1.61 |
| Layer 1 | 165 | 1.462 |
| Layer 2 | 139 | 2.068 |
| Layer 3 | 159 | 1.382 |
| Layer 4 | 137 | 2.068 |
| Layer 5 | 145 | 1.382 |
| Layer 6 | 99 | 2.068 |
| Layer 7 | 220 | 1.382 |
| Layer 8 | 74 | 2.068 |
| Layer 9 | 129 | 1.462 |
| Layer 10 | 71 | 2.068 |
| Layer 11 | 140 | 1.382 |
| Layer 12 | 67 | 2.068 |
| Layer 13 | 129 | 1.382 |
| Layer 14 | 64 | 2.068 |
| Layer 15 | 113 | 1.462 |
| Adhesive agent |  | 1.51 |

Figure 15:
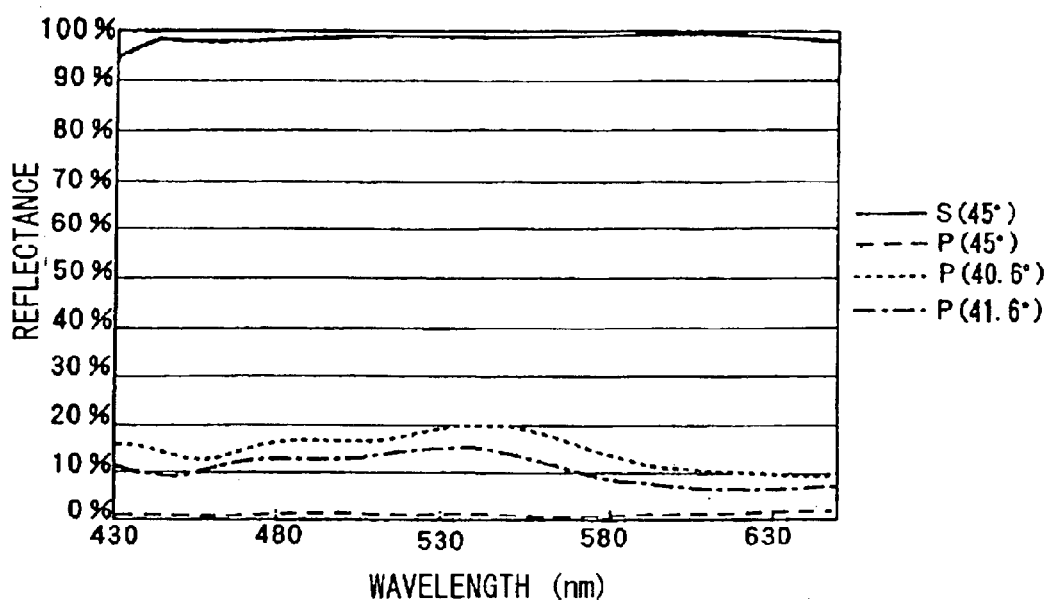
FIG. 15 is a diagram showing the polarization splitting characteristics of Numerical Example 6 of the present invention.
Figure 16:
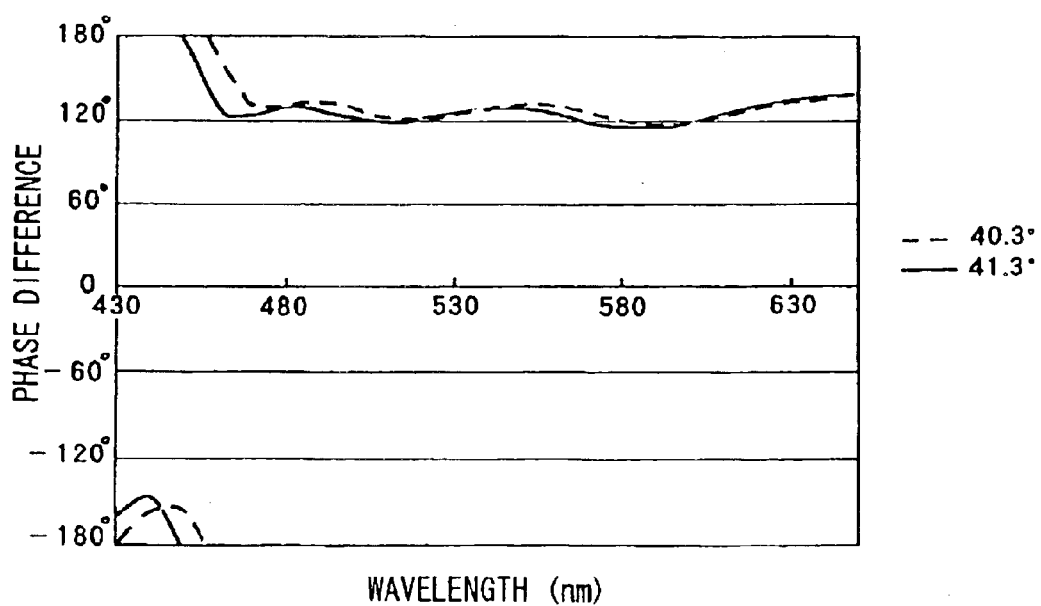
FIG. 16 is a diagram showing the phase difference characteristics of Numerical Example 6 of the present invention.

FIG. 15 shows, for Numerical Example 6, the reflectances of P-polarized light and S-polarized light for an incidence angle of 45° and the reflectances of P-polarized light for incidence angles of 40.3° and 41.3°, which are incidence angles of light rays corresponding to substantially 90% and 70% in a diagonal direction for Fno 2.3. FIG. 16 shows the phase differences of the P-polarized light and the S-polarized light at the polarization splitting film for the incidence angles of 40.3° and 41.3°.

Though the phase differences of the P-polarized light and S-polarized light at the polarization splitting film of the respective Numerical Examples given above preferably fall within the range of the conditional expression (1) in the range of white light used as illumination light (for example, 430 to 650 nm) as shown in FIGS. 10, 12, and 14, it is sufficient that average values within the range of use satisfy the conditional expression (1) as shown in FIGS. 6, 8, and 16.

Also when the illuminance factor of contrast of the projected image on a screen is considered as a measured value, the effects of the present invention can be obtained even when values obtained by weighted averaging using spectral luminous efficiencies satisfy the conditional expression (1).

The conditional expression (1) may also be satisfied not in the range of white light but in the range of colored light used for reflection at the polarization beam splitter (for example, 430 to 490 nm for blue, 510 to 570nm for green, and 590 to 630 nm for red).

Though two types of substrates, one having a refractive index of approximately 1.75 (Numerical Examples 1 and 2) and the other having a refractive index of approximately 1.61 (Numerical Examples 3 to 6) are used in the polarization beam splitters here, there are no particular restrictions in terms of the refractive index, and the leakage light amount can be reduced by providing a polarization splitting film that satisfies the conditions of the present invention in a glass material of any refractive index.

With regard to the internal characteristics of the glass material, the photoelastic coefficient β is preferably small so that the polarized light that is transmitted through the interior will not change in direction, and for example, it is preferable for:

$\beta < 1$ (nm/cm/$10^5$Pa).

Figure 18:
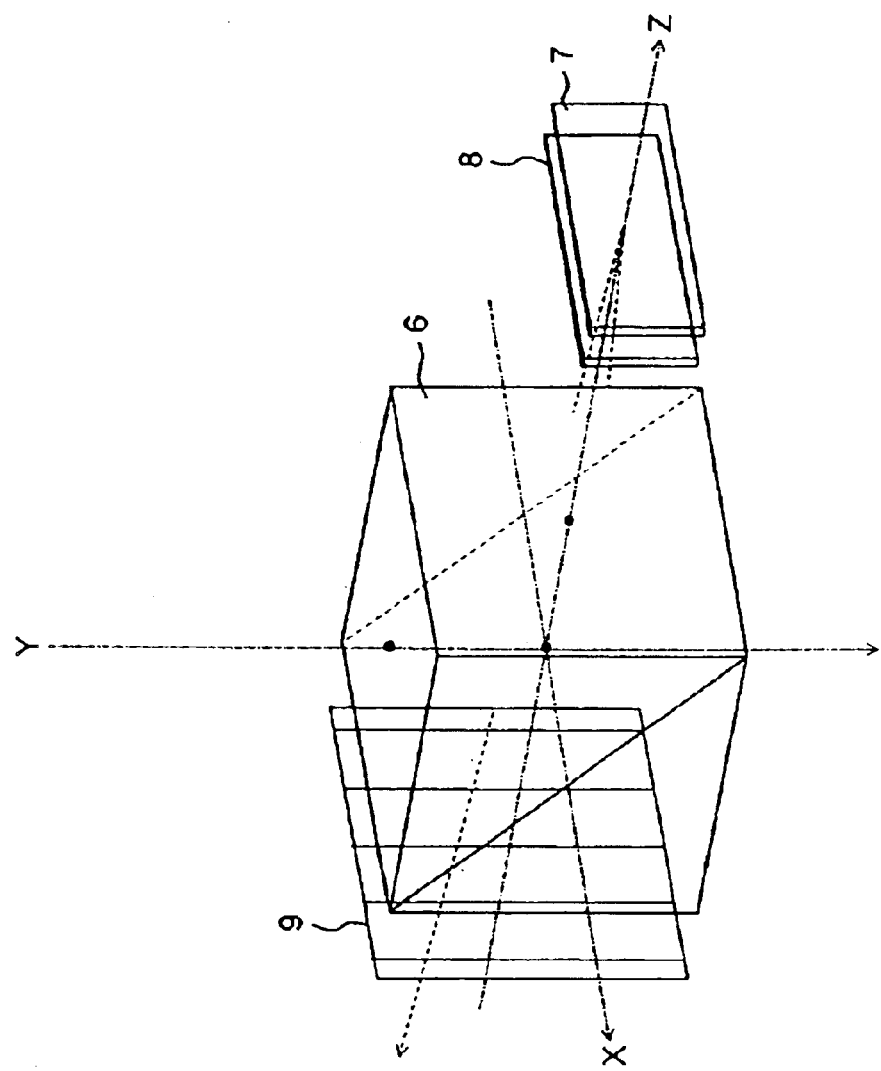
FIG. 18 is a diagram showing another configuration example of a reflection type liquid crystal display element in Embodiment 1.

Also, the long side and short side of the reflection type liquid crystal display element 7 are not restricted to the directions shown in FIG. 3 and the relationship between the long side and the short side may be inverted as shown in FIG. 18.

Figure 19:
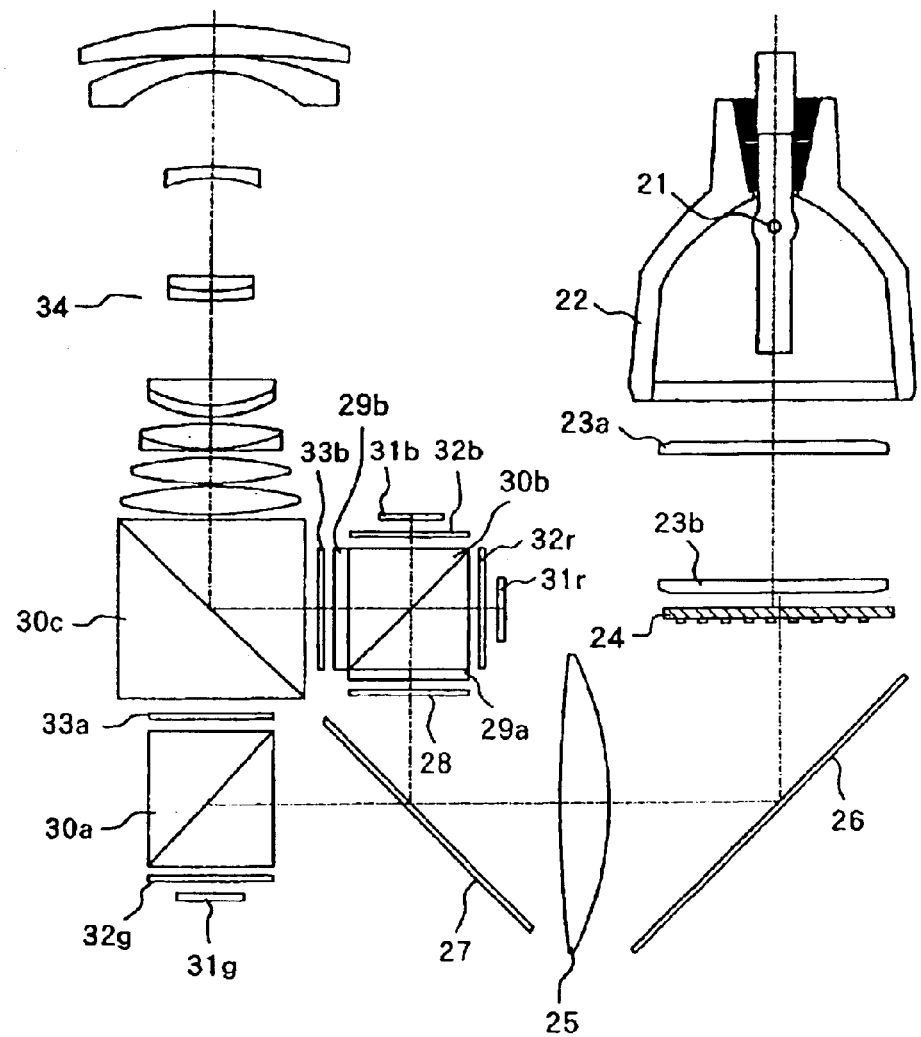
FIG. 19 is a diagram, showing the arrangement of a projection type display optical system (projection type image display apparatus), which is Embodiment 2 of the present invention.
Figure 20:
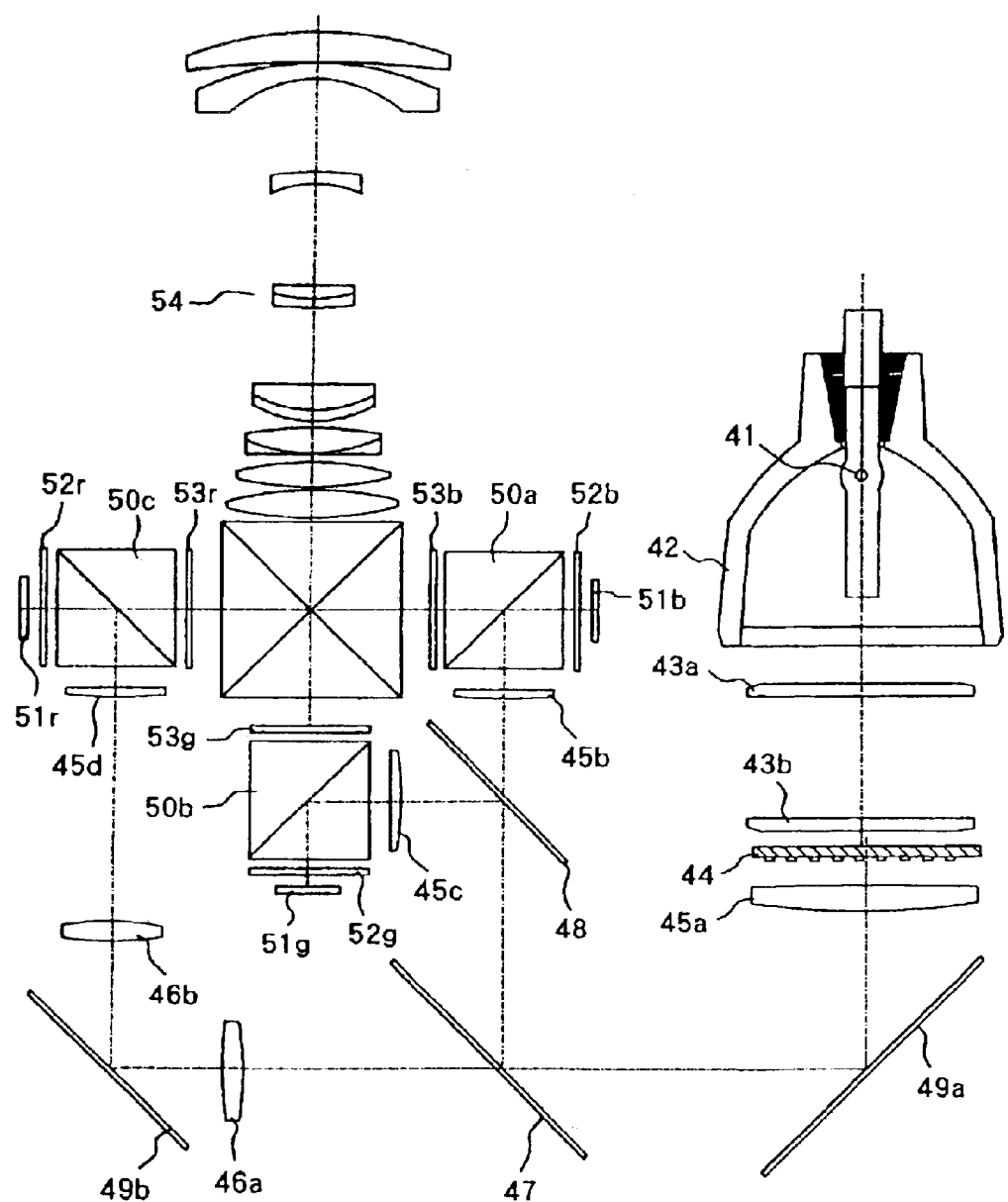
FIG. 20 is a diagram, showing the arrangement of a projection type display optical system (projection type image display apparatus), which is Embodiment 3 of the present invention.
Figure 21:
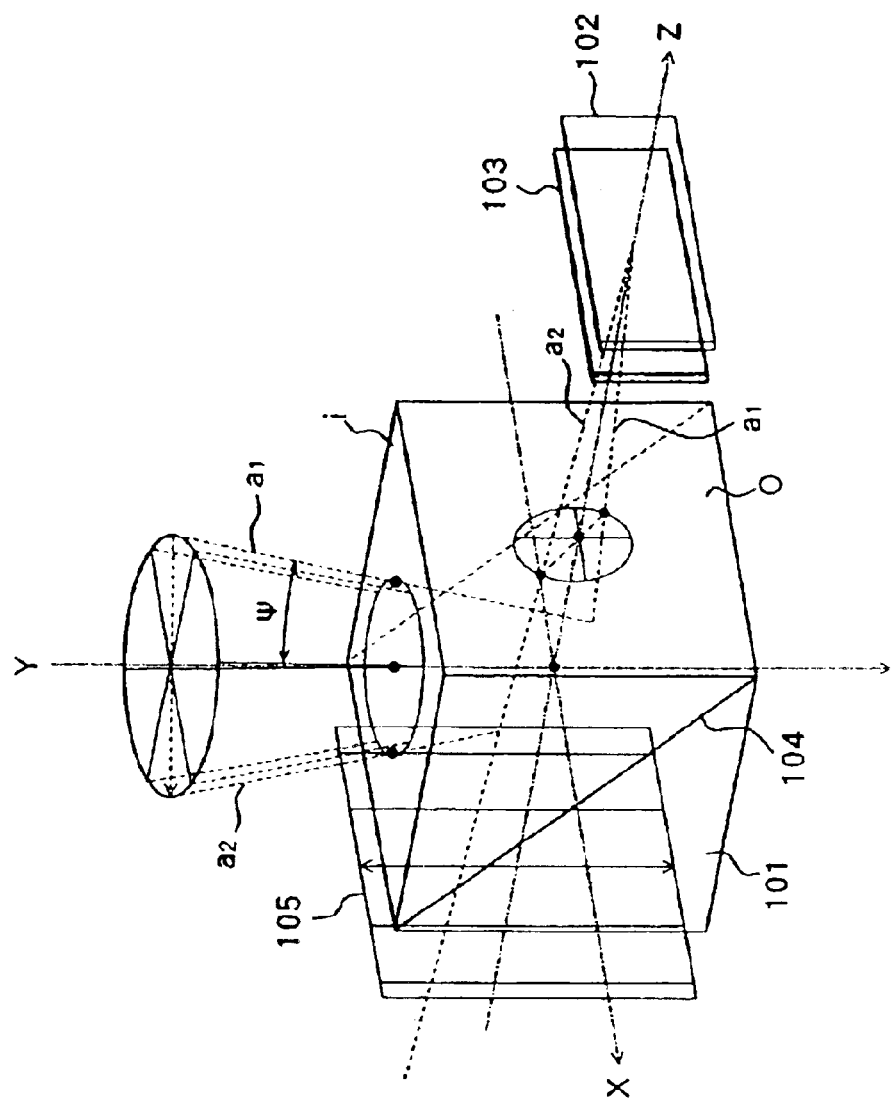
FIG. 21 is a diagram for explaining the reason why leakage light occurs at the polarization splitting film.

Also, the overall arrangement of the projection type display optical system is not restricted to that shown in FIG. 1. For example, an arrangement, combining a dichroic mirror and three polarization beam splitters and using three reflection type liquid crystal display elements as shown in FIG. 19, or an arrangement, combining three polarization beam splitters and a cross dichroic prism and using three reflection type liquid crystal display elements as shown in FIG. 20, are also possible. In other words, it is sufficient that the arrangement be one in which a polarization beam splitter is used to project an original image displayed on a reflection type liquid crystal display element.

Embodiment 2

The arrangement of the projection type display optical system shown in FIG. 19 shall now be described. Reference numeral 21 denotes a light source that emits white light of a continuous spectrum. Reference numeral 22 denotes a reflector, which converges the light in a predetermined direction. Reference numeral 23a denotes a first fly-eye lens array, having rectangular lenses positioned in matrix form, and Reference numeral 23b denotes a second fly-eye lens array, having an array of lenses corresponding to the individual lenses of the first fly-eye lens array 23a.

Reference numeral 24 denotes a polarization conversion element, which converts non-polarized light into light of a specific polarization direction (S-polarized light), Reference numeral 25 denotes a condenser lens, and Reference numeral 26 denotes a reflecting mirror.

Reference numeral 27 denotes a dichroic mirror, which reflects light of the wavelength ranges of blue (B) and red (R) and reflects light of the wavelength range of green (G). Reference numeral 28 denotes a color filter, which partially cuts light of a wavelength range that is intermediate B and R.

Reference numeral 29a denotes a first color-selective wave plate, which converts the polarization direction of B light by 90 degrees but does not convert the polarization direction of R light. Reference numeral 29b denotes a second color-selective wave plate, which converts the polarization direction of R light by 90 degrees but does not convert the polarization direction of B light.

Reference numerals 30a, 30b, and 30c denote, respectively, a first polarization beam splitter, a second polarization beam splitter, and a third polarization beam splitter, each of which transmits P-polarized light and reflects S-polarized light.

Reference numerals 31r, 31g, and 31b denote, respectively, a reflection type liquid crystal display element for red, a reflection type liquid crystal display element for green, and a reflection type liquid crystal display element for blue, each of which modulates and reflects light in accordance with a displayed original image.

Reference numerals 32r, 32g, and 32b denote, respectively, a ¼-wave plate for red, a ¼-wave plate for green, and a ¼-wave plate for blue.

Reference numerals 33a and 33b denote polarizing plates that transmit predetermined polarized components. Reference numeral 34 denotes a projection lens.

The green light acts on the first polarization beam splitter 30a, and the blue and red light act on the second polarization beam splitter 30b.

Embodiment 3

The arrangement of the projection type display optical system shown in FIG. 20 shall now be described. Reference numeral 41 denotes a light source that emits white light of a continuous spectrum. Reference numeral 42 denotes a reflector, which converges the light from the light source 41 in a predetermined direction. Reference numeral 43a denotes a first fly-eye lens array, having rectangular lenses positioned in matrix form, and Reference numeral 43b denotes a second fly-eye lens array, having an array of lenses corresponding to the individual lenses of the first fly-eye lens array 43a.

Reference numeral 44 denotes a polarization conversion element, which converts non-polarized light into light of predetermined polarization (S-polarized light). Reference numeral 45a denotes a condenser lens. Reference numerals 45b, 45c, and 45d denote field lenses, and Reference numerals 46a and 46b denote relay lenses for transmitting the illumination light without loss through a long optical path.

Reference numeral 47 denotes a dichroic mirror, which transmits light of the wavelength range of red (R) and reflects light of the wavelength ranges of blue (B) and green (G). Reference numeral 48 denotes a dichroic mirror, which transmits light of the wavelength range of blue (B) and reflects light of the wavelength range of green (G).

Reference numerals 49a and 49b denote reflecting mirrors. Reference numerals 50a, 50b, and 50c denote, respectively, a first polarization beam splitter, a second polarization beam splitter, and a third polarization beam splitter, each of which transmits P-polarized light and reflects S-polarized light.

Reference numerals 51r, 51g, and 51b denote, respectively, a reflection type liquid crystal display element for red, a reflection type liquid crystal display element for green, and a reflection type liquid crystal display element for blue, each of which modulates and reflects light in accordance with a displayed original image.

Reference numerals 52r, 52g, and 52b denote, respectively, a ¼-wave plate for red, a ¼-wave plate for green, and a ¼-wave plate for blue.

Reference numerals 53r, 53g, and 53b denote polarizing plates that transmit predetermined polarized components. Reference numeral 54 denotes a projection lens.

The blue light acts on the first polarization beam splitter 50a, the green light acts on the second polarization beam splitter 50b, and the red light acts on the third polarization beam splitter 50c.

While preferred embodiments have been described, it is to be understood that modification and variation of the present invention may be made without departing from scope of the following claims.

What is claimed is:

1. A polarization beam splitting optical system, comprising:

a polarization splitting film which guides polarized light from a first optical system to a reflection type image forming element and then analyzes and guides polarized light from the image forming element to a second optical system;

wherein the polarization splitting film has a structure which satisfies the following condition:

$$120° \leq |\delta| \leq 180°;$$

where $\delta$ is the phase difference of P-polarized light and S-polarized light at the polarization splitting film.

2. The polarization beam splitting optical system according to claim 1, wherein further satisfies the following condition:

$$Rp > 0\%;$$

where Rp is the reflectance, at the polarization splitting film, of the P-polarized light that is incident on the polarized splitting film at an angle $\theta$ with respect to a normal to the polarization splitting film, the incidence angle $\theta$ satisfying the condition:

$$\alpha - \psi \leq \theta \leq \alpha + \psi;$$

where $\alpha$ is an angle formed by an optical axis leading from the first optical system to the polarization splitting film and the normal to the polarization splitting film, and $\psi$ is a maximum incidence angle of light incident onto the polarization splitting film with respect to the optical axis leading from the first optical system to the polarization splitting film.

3. The polarization beam splitting optical system according to claim 1, wherein the polarization splitting film is disposed so as to be inclined with respect to an optical axis of the first optical system.

4. The polarization beam splitting optical system according to claim 1, wherein a ¼-wave plate is disposed between the polarization splitting film and the image forming element.

5. The polarization beam splitting optical system according to claim 1, wherein

δ is the phase difference of P-polarized light and S-polarized light at a point of reflection at the polarization splitting film.

6. The polarization beam splitting optical system according to claim 1, wherein the polarization splitting film has a structure by which the polarization direction of polarized light that is incident on the polarization splitting film at an angle θ with respect to a normal to the polarization splitting film and at a first azimuth angle and that is reflected by the polarization beam splitting film, is between:

(i) the polarization direction of polarized light that is reflected at the polarization splitting film, which is determined based on the geometrical relationship of the polarization splitting film and the direction of incidence of polarized light on the polarization splitting film, and (ii) the polarization direction of polarized light, after the polarized light has been incident on the polarization splitting film at the angle θ with respect to the normal to polarization splitting film and at a second azimuth angle which is directly opposite to the first azimuth angle, and has been reflected at the polarization splitting film and then has passed through a ½-wave plate.

7. The polarization beam optical system according to claim 6, wherein passing through the ½-wave plate means passing through a ¼-wave plate twice.

8. A polarization beam splitting optical system, comprising:

a polarization splitting film which guides polarized light from a first optical system to a reflection type image forming element and then analyzes and guides polarized light from the image forming element to a second optical system;

wherein the polarization splitting film has a structure by which the polarization direction of polarized light that is incident on the polarization splitting film at an angle θ with respect to a normal to the polarization splitting film and at a first azimuth angle and that is reflected by the polarization splitting film, is between:

(i) the polarization direction of polarized light that is reflected at the polarization splitting film, which is determined based on the geometrical relationship of the polarization splitting film and the direction of incidence of polarized light on the polarization splitting film, and (ii) the polarization direction of polarized light, after the polarized light has been incident on the polarization splitting film at the angle θ with respect to the normal to polarization splitting film and at a second azimuth angle which is directly opposite to the first azimuth angle and has been reflected at the polarization splitting film and then has passed through a ½-wave plate.

9. The polarization beam optical system according to claim 8, wherein passing through the ½-wave plate means passing through a ¼-wave plate twice.

10. The polarization beam splitting optical system according to claim 8, wherein the angle θ is an angle that is smaller than an angle formed by the polarization splitting film and a plane orthogonal to an optical axis leading from the first optical system to the polarization splitting film.

11. A projection type display optical system comprising:

a first optical system which illuminates light onto a reflection type image forming element;

the polarization beam splitting optical system according to claim 1; and a second optical system which projects light from the polarization beam splitting optical system onto a projection surface.

12. A projection type image display apparatus comprising:

the projection type display optical system according to claim 11; and a reflection type image forming element which modulates the light from the first optical system.

13. An image display system comprising:

the projection type image display apparatus according to claim 12; and an image information supplying apparatus which supplies image information for making the image forming element form an original image to the projection type image display apparatus.

14. A projection type display optical system comprising:

a first optical system which illuminates light onto a reflection type image forming element;

the polarization beam splitting optical system according to claim 8; and a second optical system which projects light from the polarization beam splitting optical system onto a projection surface.

15. A projection type image display apparatus comprising:

the projection type display optical system according to claim 14; and a reflection type image forming element which modulates the light from the first optical system.

16. An image display system comprising:

the projection type image display apparatus according to claim 15; and an image information supplying apparatus which supplies image information for making the image forming element form an original image to the projection type image display apparatus.

* * * * *